US011969976B2

(12) United States Patent
Camelo et al.

(10) Patent No.: US 11,969,976 B2
(45) Date of Patent: Apr. 30, 2024

(54) MULTILAYER FILMS THAT INCLUDE AT LEAST FIVE LAYERS AND METHODS OF PRODUCING THE SAME

(71) Applicants: Dow Global Technologies LLC, Midland, MI (US); Dow Quimica de Colombia S.A., Bogota (CO)

(72) Inventors: Jorge Mario Rodriguez Camelo, Bogota (CO); Marlos Guintini de Oliveira, Sao Paulo (BR); Nicolas Cardoso Mazzola, Sao Paulo (BR); Sanjib Biswas, Lake Jackson, TX (US); Joshua B. Gaubert, Lake Jackson, TX (US); Douglas S. Ginger, Lake Jackson, TX (US); Mridula Kapur, Lake Jackson, TX (US); Didem Oner-Deliormanli, Freeport, TX (US); Mehmet Demirors, Pearland, TX (US)

(73) Assignees: Dow Global Technologies LLC, Midland, MI (US); Dow Quimica De Colombia S.A., Bogota (CO)

( * ) Notice: Subject to any disclaimer, the term of this patent is extended or adjusted under 35 U.S.C. 154(b) by 234 days.

(21) Appl. No.: 17/632,468

(22) PCT Filed: Aug. 4, 2020

(86) PCT No.: PCT/US2020/044862
§ 371 (c)(1),
(2) Date: Feb. 2, 2022

(87) PCT Pub. No.: WO2021/026139
PCT Pub. Date: Feb. 11, 2021

(65) Prior Publication Data
US 2022/0288899 A1    Sep. 15, 2022

Related U.S. Application Data

(60) Provisional application No. 62/883,475, filed on Aug. 6, 2019, provisional application No. 62/883,467, filed on Aug. 6, 2019.

(51) Int. Cl.
*B32B 27/08* (2006.01)
*B32B 27/32* (2006.01)

(52) U.S. Cl.
CPC ............. *B32B 27/08* (2013.01); *B32B 27/32* (2013.01); *B32B 2250/05* (2013.01); *B32B 2250/242* (2013.01); *B32B 2307/558* (2013.01); *B32B 2307/5825* (2013.01); *B32B 2307/72* (2013.01); *B32B 2307/732* (2013.01); *B32B 2439/46* (2013.01)

(58) Field of Classification Search
CPC ....... B32B 27/08; B32B 27/32; B32B 27/327; B32B 2250/05; B32B 2250/242
See application file for complete search history.

(56) References Cited

U.S. PATENT DOCUMENTS

| | | |
|---|---|---|
| 3,003,000 A | 10/1961 | Milas et al. |
| 3,645,922 A | 2/1972 | Elston et al. |
| 3,914,342 A | 10/1975 | Mitchell |
| 4,076,698 A | 2/1978 | Anderson et al. |
| 4,599,392 A | 7/1986 | McKinney et al. |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa |
| 5,854,045 A | 12/1998 | Fang et al. |
| 6,306,969 B1 * | 10/2001 | Patel .......................... C08J 5/18 525/240 |
| 6,582,828 B1 | 6/2003 | Kaschel |
| 6,586,061 B1 * | 7/2003 | Sasaki ..................... B32B 27/08 428/517 |
| 9,242,431 B2 | 1/2016 | Cruz et al. |
| 9,505,508 B2 | 11/2016 | Berbert |

(Continued)

FOREIGN PATENT DOCUMENTS

| | | |
|---|---|---|
| CA | 2897575 A1 | 7/2014 |
| EP | 1935909 A1 | 6/2008 |

(Continued)

OTHER PUBLICATIONS

Indonesian Office Action dated Sep. 5, 2023, pertaining to ID Patent Application No. P00202201543, 6 pgs.
Brazil Office Action dated Oct. 6, 2023, pertaining to BR Patent Application No. BR112022001974.2, 8 pgs.
Brazil Office Action dated Oct. 23, 2023, pertaining to BR Patent Application No. BR112022002023.6, 8 pgs.
Brazil Office Action dated Oct. 23, 2023, pertaining to BR Patent Application No. BR112022001979.3, 8 pgs.
Brazil Office Action dated Oct. 23, 2023, pertaining to BR Patent Application No. BR112022002086.4, 8 pgs.

(Continued)

*Primary Examiner* — Prashant J Khatri
(74) *Attorney, Agent, or Firm* — Dinsmore & Shohl LLP

(57) ABSTRACT

Embodiments of the present disclosure are directed to multilayer films. Embodiments of the multilayer films may include a first layer comprising a first polyolefin, a second layer comprising a second polyolefin, a third layer comprising a third polyolefin, fourth layer comprising a fourth polyolefin, and a fifth layer comprising a fifth polyolefin. The second layer may be positioned between the first layer and the third layer; the third layer may be positioned between the second layer and the fourth layer; and the fourth layer may be positioned between the third layer and the fifth layer. Two or more of the first polyolefin, second polyolefin, third polyolefin, and fourth polyolefin may be the same or different. The third polyolefin may be a polyethylene composition having a density of 0.924 g/cm$^3$ to 0.936 g/cm$^3$ and a melt index ($I_2$) of 0.25 g/10 minutes to 2.0 g/10 minutes.

15 Claims, 3 Drawing Sheets

(56) References Cited

U.S. PATENT DOCUMENTS

| | | | |
|---|---|---|---|
| 9,631,059 | B2 | 4/2017 | Demirors et al. |
| 9,688,795 | B2 | 6/2017 | Cerk et al. |
| 2002/0065370 | A1 | 5/2002 | Chikanari et al. |
| 2004/0241483 | A1 | 12/2004 | Farley et al. |
| 2010/0099824 | A1* | 4/2010 | Helland .............. C08J 5/18 |
| | | | 525/240 |
| 2012/0100356 | A1 | 4/2012 | Ohlsson et al. |
| 2014/0134302 | A1 | 5/2014 | Hodge |
| 2014/0255674 | A1 | 9/2014 | Tice et al. |
| 2015/0360450 | A1 | 12/2015 | Barbaroux et al. |
| 2018/0046104 | A1 | 2/2018 | Fukatsu et al. |
| 2018/0051704 | A1 | 2/2018 | Kihara et al. |
| 2018/0155474 | A1 | 6/2018 | Holtcamp et al. |
| 2018/0170015 | A1 | 6/2018 | Solis et al. |
| 2019/0100644 | A1 | 4/2019 | Williamson et al. |
| 2019/0135959 | A1* | 5/2019 | Kazemi ............. C08F 210/16 |
| 2019/0225786 | A1 | 7/2019 | Yang et al. |
| 2020/0239673 | A1 | 7/2020 | Ssubramaniam et al. |

FOREIGN PATENT DOCUMENTS

| | | |
|---|---|---|
| EP | 1961558 A1 | 8/2008 |
| EP | 2177548 A1 | 4/2010 |
| EP | 2348057 A1 | 7/2011 |
| EP | 2653392 B1 | 10/2015 |
| EP | 2106421 B2 | 6/2016 |
| EP | 3772415 B1 | 12/2022 |
| EP | 4010191 B1 | 7/2023 |
| JP | 2015074197 A | 4/2015 |
| JP | 2016051398 A | 4/2016 |
| JP | 2017061123 A | 3/2017 |
| WO | 199947601 | 9/1999 |
| WO | 2005023912 A2 | 3/2005 |
| WO | 2005111291 A1 | 11/2005 |
| WO | 2007045415 A1 | 4/2007 |
| WO | 2007095667 A1 | 8/2007 |
| WO | 2008089978 A1 | 7/2008 |
| WO | 2008124557 A1 | 10/2008 |
| WO | 2010034463 A1 | 4/2010 |
| WO | 2010047709 A1 | 4/2010 |
| WO | 2011019563 A1 | 2/2011 |
| WO | 2012003042 A1 | 1/2012 |
| WO | 2013087531 A1 | 6/2013 |
| WO | 2014051682 A1 | 4/2014 |
| WO | 2015200743 A1 | 12/2015 |
| WO | 2016025168 A1 | 2/2016 |
| WO | 2016145550 A1 | 9/2016 |
| WO | 2016196168 A1 | 12/2016 |
| WO | 2017040127 A1 | 3/2017 |
| WO | 2017097573 A1 | 6/2017 |
| WO | 2017155609 A1 | 9/2017 |
| WO | 2017172273 A1 | 10/2017 |
| WO | 2018002196 A1 | 1/2018 |
| WO | 2018106480 A1 | 6/2018 |
| WO | 2018172510 A1 | 9/2018 |
| WO | 2019070440 A1 | 4/2019 |

OTHER PUBLICATIONS

U.S. Office Action dated Nov. 29, 2023, pertaining to U.S. Appl. No. 17/632,706, 7 pgs.

Indonesian Notification and Examination Report, dated Aug. 9, 2023, pertaining to Indonesian Patent Application No. P00202201478, 5 pgs.

International Search Report and Written Opinion dated Oct. 8, 2020, pertaining to Int'l Appl. No. PCT/US2020/044856 filed Aug. 4, 2020, 13 pgs.

International Search Report and Written Opinion dated Oct. 15, 2020, pertaining to Int'l Appl. No. PCT/US2020/044857 filed Aug. 4, 2020, 13 pgs.

International Search Report and Written Opinion dated Oct. 12, 2020, pertaining to Int'l Appl. No. PCT/US2020/044862 filed Aug. 4, 2020, 13 pgs.

International Search Report and Written Opinion dated Oct. 13, 2020, pertaining to Int'l Appl. No. PCT/US2020/044860 filed Aug. 4, 2020, 13 pgs.

International Search Report and Written Opinion dated Oct. 8, 2020, pertaining to Int'l Appl. No. PCT/US2020/044863 filed Aug. 4, 2020, 13 pgs.

International Search Report and Written Opinion dated Oct. 14, 2020, pertaining to Int'l Appl. No. PCT/US2020/044864 filed Aug. 4, 2020, 13 pgs.

161/162 Communication dated Mar. 15, 2022, pertaining to EP Patent Application No. 20761662.4, 3 pgs.

International Preliminary Report on Patentability dated Feb. 8, 2022, pertaining to EP Patent Application No. 20761662.4, 6 pgs.

161/162 Communication dated Mar. 15, 2022, pertaining to EP Patent Application No. 20758398.0, 3 pgs.

International Preliminary Report on Patentability dated Feb. 8, 2022, pertaining to EP Patent Application No. 20758398.0, 6 pgs.

Non-Final Office Action dated Apr. 4, 2022, pertaining to U.S. Appl. No. 16/984,765, 11 pgs.

Milas et al., "Studies in Organic Peroxides XXV Preparation, Separation and Identification of Peroxides Derived from Methyl Ethyl Ketone and Hydrogen Peroxide," A., J. Am. Chem. Soc, vol. 81, pp. 5824-5826 (1959).

India Examination Report dated Dec. 22, 2023, pertaining to IN Patent Application No. 202217005875, 7 pgs.

* cited by examiner

MULTILAYER FILMS THAT INCLUDE AT LEAST FIVE LAYERS AND METHODS OF PRODUCING THE SAME

CROSS-REFERENCE TO RELATED APPLICATIONS

This application is a National Stage Entry under 35 U.S.C. §371 of International Patent Application No. PCT/US2020/044862, filed Aug. 4, 2020, which claims priority to U.S. Provisional Patent Application No. 62/883,475, filed on Aug. 6, 2019, and U.S. Provisional Patent Application No. 62/883,467, filed Aug. 6, 2019, the entire disclosures of which are hereby incorporated by reference.

TECHNICAL FIELD

Embodiments described herein generally relate to multilayer films and, more specifically, to multilayer films including polyethylene.

BACKGROUND

Improved sustainability is a continual goal for manufacturers of multilayer films that include polyethylene. It is therefore beneficial for monolayer and multilayer polymer films, which may include blown or cast films, to demonstrate toughness with down-gauging (i.e., using thinner film thicknesses), which can allow for a reduction of material costs. However, obtaining polymer films which have sufficient toughness at lesser thicknesses is often challenging.

SUMMARY

One industry promoting down-gauging includes the heavy duty shipping sacks (HDSS) market. Heavy duty shipping sacks may include large bags that are designed to carry more than 10 kilograms of goods. Some examples of goods carried by heavy duty shipping sacks include chemical resin pellets, pigments, sugar, fertilizers, sand, rice, intermediates products, and others. However, conventional 3-layer films used in HDSS applications are generally unable to deliver a suitable balance of toughness and creep resistance when the thickness of the multilayer film is reduced. Therefore, there are needs for multilayer films that exhibit physical properties, such as dart/bag drop, puncture, tear, and creep resistance, that meet customer and industry requirements. In some embodiments, these multilayer films may still maintain physical properties that meet customer and industry requirements even at reduced thicknesses.

Embodiments of the present disclosure meet those needs by providing multilayer films including at least five layers that provide a balance of stiffness and abuse properties (i.e. dart, puncture energy, tear). Such multilayer films may include a polyethylene composition in a core layer, which exhibits an improved balance of toughness and creep resistance. Moreover, when reducing the overall thickness of the multilayer including a polyethylene composition in a core layer, the multilayer film may still exhibits an improved balance of toughness and creep resistance when compared to conventional multilayer films.

According to at least one embodiment of the present disclosure, a multilayer film may include a first layer comprising a first polyolefin, a second layer comprising a second polyolefin, a third layer comprising a third polyolefin, a fourth layer comprising a fourth polyolefin, and a fifth layer comprising a fifth polyolefin. Two or more of the first polyolefin, second polyolefin, third polyolefin, and fourth polyolefin may be the same or different in composition. The second layer may be positioned between the first layer and the third layer. The third layer may be positioned between the second layer and the fourth layer. The fourth layer may be positioned between the third layer and the fifth layer. The third polyolefin may be a polyethylene composition comprising (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and (b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.; wherein the polyethylene composition has a density of 0.924 $g/cm^3$ to 0.936 $g/cm^3$ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

According to at least another embodiment of the present disclosure, a multilayer film may include a first layer comprising a linear low density polyethylene having a density from 0.905 $g/cm^3$ to 0.936 $g/cm^3$, a second layer comprising a polyethylene having a density of greater than 0.940 $g/cm^3$, when measured according to ASTM 742, a third layer comprising a third polyolefin, a fourth layer comprising a polyethylene having a density of greater than 0.940 $g/cm^3$, when measured according to ASTM 742, and a fifth layer comprising a linear low density polyethylene having a density from 0.905 $g/cm^3$ to 0.936 $g/cm^3$. Two or more of the first polyolefin, second polyolefin, third polyolefin, and fourth polyolefin may be the same or different in composition. The second layer may be positioned between the first layer and the third layer. The third layer may be positioned between the second layer and the fourth layer. The fourth layer may be positioned between the third layer and the fifth layer. The third polyolefin may be a polyethylene composition comprising (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and (b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.; wherein the polyethylene composition has a density of 0.924 $g/cm^3$ to 0.936 $g/cm^3$ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

As such, embodiments of the present disclosure may provide multilayer films that provide a balance of stiffness and abuse properties (e.g. dart, puncture energy, tear) at reduced thicknesses.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
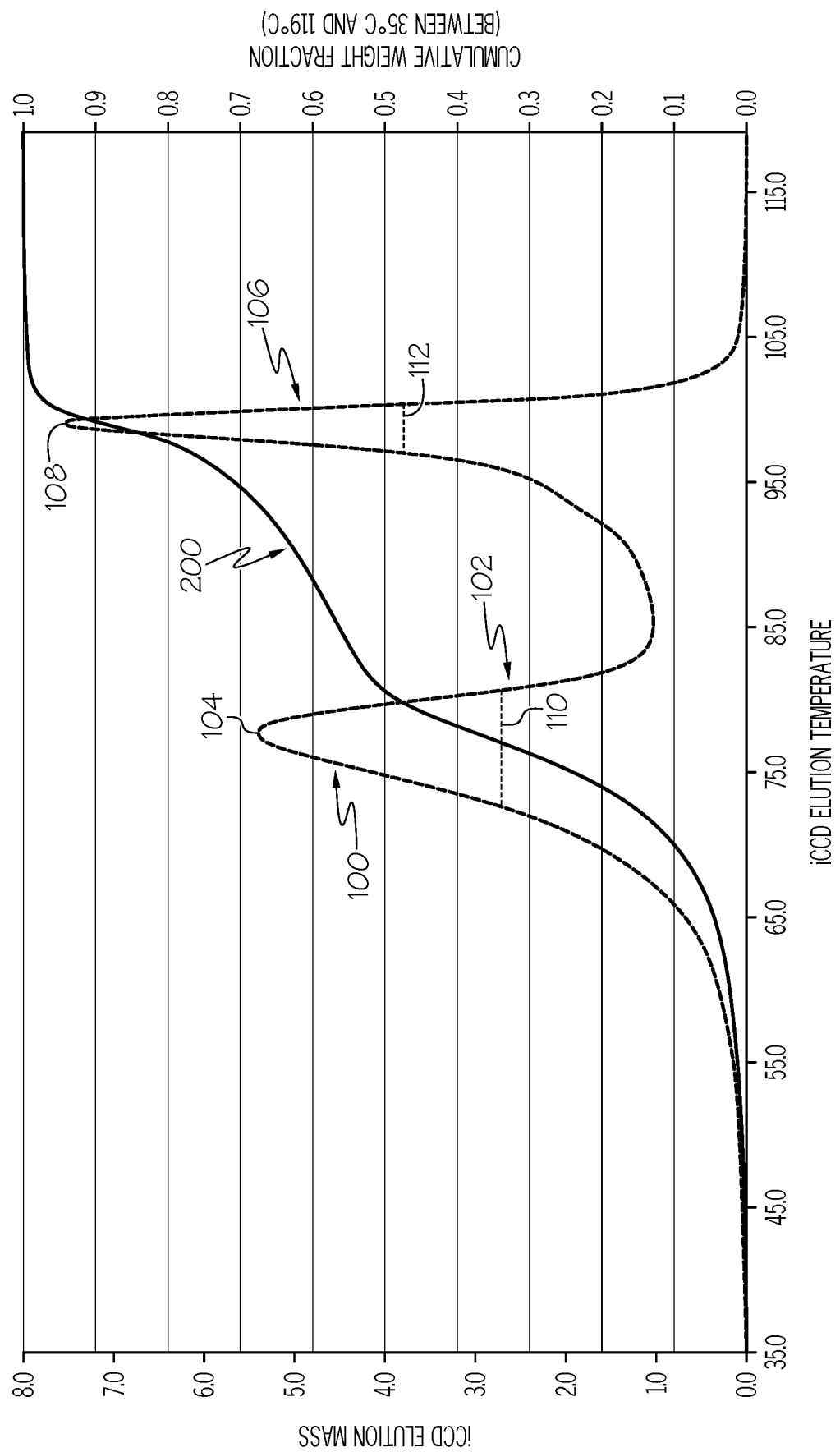
FIG. 1 schematically depicts an iCCD elution profile, according to one or more embodiments presently described.

Specific embodiments of the present application will now be described. These embodiments are provided so that this disclosure will be thorough and complete and will fully convey the scope of the claimed subject matter to those skilled in the art.

Unless stated to the contrary, implicit from the context, or customary in the art, all parts and percents are based on weight, all temperatures are in degrees Celsius (° C.), and all test methods are current as of the filing date of this disclosure.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

As described herein, a "polyethylene" or "ethylene-based polymer" refers to polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "composition," as used herein, refers to a mixture of materials which comprises the composition, as well as reaction products and decomposition products formed from the materials of the composition.

"Polypropylene" or "propylene-based polymer" as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 to 0.940 g/cm$^3$.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. Nos. 3,914,342 and 5,854,045). The LLDPE resins can be made via gas-phase, solution-phase, or slurry polymerization or any combination thereof, using any type of reactor or reactor configuration known in the art.

The term "MDPE" refers to polyethylenes having densities from 0.924 to 0.936 g/cm$^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy).

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 g/cm$^3$ to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 g/cm$^3$ to 0.912 g/cm$^3$.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

"Multilayer structure" or "multilayer film" means any structure having more than one layer. For example, the multilayer structure (for example, a film) may have five or more layers. A multilayer structure may be described as having the layers designated with letters. For example, a five layer structure designated as A/B/C/D/E may have a core layer, C, and two external layers, A and E, and two inner layers, B and D. In some embodiments, a multilayer film of the present disclosure may comprise up to 11, 13, 15, or more layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Multilayer Films

Reference will now be made to embodiments of the multilayer films described herein. Embodiments of the presently-described multilayer films may include at least five layers.

Multilayer films of the present disclosure may include at least five layers and even as many as 13 layers. The number of layers in the multilayer film may depend on a number of factors including, for example, the composition of each layer in the multilayer film, the desired properties of the multilayer film, the desired end-use application of the multilayer film, the manufacturing process of the multilayer film, and others. The multilayer film may be a five-layer structure designated as A/B/C/D/E, where the first layer may be designated as A, the second layer may be designated as B, the third layer may be designated as C, the fourth layer may be designated as D, and the fifth layer may be designated as E. In some embodiments, the third layer may be referred to as a "core layer." In some embodiments, one or both of the first layer and the fifth layer may be referred to as "skin layers" or "outer layers." In some embodiments, one or both of the second layer and the fourth layer may be referred to as "inner layers." In embodiments, the second layer may be positioned between the first layer and the third layer. The third layer may be positioned between the second layer and the fourth layer. The fourth layer may be positioned between the third layer and the fifth layer. In further embodiments, the first layer and the fifth layer may be the outermost layers of the multilayer film. As used herein, the outermost layers of the multilayer film may be understood to mean there may not be another layer deposited over the outermost layer, such that the outermost layer is in direct contact with the surrounding air.

In embodiments, one or more of the first layer, the second layer, the third layer, the fourth layer, or the fifth layer may be in direct contact with one another. As used herein, "direct contact" means that there may not be any other layers positioned between the two layers that are in direct contact with one another. In further embodiments, the first layer may be in direct contact with the second layer. In some embodiments, the second layer may be in direct contact with one or both of the first layer and the third layer. In some embodiments, the third layer may be in direct contact with one or both of the fourth layer and the second layer. In embodiments, the fourth layer may be in direct contact with the fifth layer. In some embodiments, one or more tie layers may be disposed between the one or more of the first layer and the second layer, the second layer and the third layer, the third layer and the fourth layer, or the fourth layer and the fifth layer.

As described in more detail subsequently in this disclosure, the multilayer films may include a first layer comprising a first polyolefin, a second layer comprising a second polyolefin, a third layer comprising a third polyolefin, fourth layer comprising a fourth polyolefin, and a fifth layer comprising a fifth polyolefin. Two or more of the first polyolefin, second polyolefin, third polyolefin, fourth polyolefin, and fifth polyolefin may be the same or different in composition. It should be understood that any of the foregoing layers can further comprise one or more additives as known to those of skill in the art such as, for example, plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into one or more of the first layer, the second layer, the third layer, the fourth layer, the fifth layer, and combinations thereof. In some embodiments, the first layer, the second layer, the third layer, the fourth layer, the fifth layer, and combinations may each include up to 5 weight percent of such additional additives. All individual values and subranges from 0 wt. % to 5 wt. % are included and disclosed herein; for example, the total amount of additives in the first layer, the second layer, the third layer, the fourth layer, or the fifth layer, can be from 0.5 wt. % to 5 wt. %, from 0.5 wt. % to 4 wt. %, from 0.5 wt. % to 3 wt. %, from 0.5 wt. % to 2 wt. %, from 0.5 wt. % to 1 wt. %, from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of the respective layer. The incorporation of the additives can be carried out by any known process such as, for example, by dry blending, by extruding a mixture of the various constituents, by the conventional masterbatch technique, or the like.

The multilayer films of the present disclosure can have a variety of thicknesses. The thickness of the multilayer film may depend on a number of factors including, for example, the number of layers in the multilayer film, the composition of the layers in the multilayer film, the desired properties of the multilayer film, the desired end-use application of the film, the manufacturing process of the multilayer film, and others. In embodiments, the multilayer film may have a thickness of 15 micrometers (μm or microns) to 250 μm. In other embodiments, the multilayer film may have an overall thickness of from 15 μm to 200 μm, from 15 μm to 1500 μm, from 15 μm to 100 μm, from 15 μm to 75 μm, from 15 μm to 50 μm, from 15 μm to 25 μm, from 25 μm to 115 μm, from 25 μm to 100 μm, from 25 μm to 75 μm, from 25 μm to 50 μm, from 50 μm to 115 μm, from 50 μm to 100 μm, from 50 μm to 75 μm, from 75 μm to 115 μm, from 75 μm to 100 μm, or from 100 μm to 115 μm.

The multilayer films of the present disclosure may have an overall density that depends on a number of factors including, for example, the number of layers in the multilayer film, the composition of the layers in the multilayer film, the desired properties of the multilayer film, the desired end-use application of the film, the manufacturing process of the multilayer film, and others. In embodiments, the multilayer film may have an overall density of at least 0.925 grams per cubic centimeter ($g/cm^3$). In other embodiments, the overall density of the multilayer film may be from 0.925 $g/cm^3$ to 0.940 $g/cm^3$, from 0.925 $g/cm^3$ to 0.935 $g/cm^3$, from 0.925 $g/cm^3$ to 0.930 $g/cm^3$, from 0.930 $g/cm^3$ to 0.940 $g/cm^3$, from 0.930 $g/cm^3$ to 0.935 $g/cm^3$, or from 0.935 $g/cm^3$ to 0.940 $g/cm^3$.

The multilayer films of the present disclosure may have may have relatively good dart strength when measured according to ASTM D1709 Method A. In embodiments, the multilayer film may have a dart drop impact of at least 700 grams when measured according to ASTM D1709 Method A. In other embodiments, the multilayer film may have a dart drop impact of from 700 grams to 2000 grams, from 700 grams to 1500 grams, 700 grams to 1000 grams, from 1000 grams to 2000 grams, from 1000 grams to 1500 grams, or from 1500 grams to 2000 grams when measured according to ASTM D1709 Method A.

The multilayer films of the present disclosure may have a tensile creep in a cross direction of less than 50%, when measured in accordance with ASTM 2990 at 1.7 kg, 15 hours, and 50° C. In other embodiments, the multilayer film may have a tensile creep of less than 40% or less than 30%, when measured in accordance with ASTM 2990 at 1.7 kg, 15 hours, and 50° C.

The multilayer films of the present disclosure may have a puncture energy at break of greater than 30 in-lbf, when measured according to the test methods described subsequently in this disclosure. In other embodiments, the multilayer film may have a puncture energy at break of greater than 40 in-lbf or 50 in-lbf, when measured according to the test methods described subsequently in this disclosure.

The multilayer films of the present disclosure may have an average secant modulus in a machine direction of at least 50,000 psi, when measured in accordance with ASTM D882. In other embodiments, the multilayer film may have an average secant modulus in a machine direction of at least 55,000 psi or 60,000 psi, when measured in accordance with ASTM D882. The multilayer films of the present disclosure may have an average secant modulus in a cross direction of at least 55,000 psi, when measured in accordance with ASTM D882. In other embodiments, the multilayer film may have an average secant modulus in a cross direction of at least 60,000 psi or 70,000 psi, when measured in accordance with ASTM D882.

First Layer

As stated previously, the presently-disclosed multilayer films may include a first layer. In the multilayer film designated as five-layer structure, A/B/C/D/E, the first layer may be designated as A. In some embodiments, the first layer may be referred to as a "skin layer." In further embodiments, the first layer may be one of the outermost layers of the multilayer film. In further embodiments, the first layer may be in direct contact with the second layer.

The first layer of the multilayer films of the present disclosure can have a variety of thicknesses. The thickness of the first layer may depend on a number of factors including, for example, the composition of the first layer, the desired overall properties of the multilayer film, the desired end-use application of the multilayer film, the manufacturing process of the multilayer film, and others. In embodiments, the first layer may have a thickness of from 0.5 micrometers (μm or microns) to 50 μm. In other embodiments, the first layer may have a thickness of from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The first layer of the multilayer films may make up from 5 wt. % to 40 wt. % of the total weight of the multilayer film. In some embodiments, the first layer may make up from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film.

In various embodiments, the first layer may include one or more materials that impart properties into the multilayer film that aid in stretch, processability, and others. In embodiments, the first layer may include a first polyolefin. In some embodiments, the first polyolefin may be the same as the fifth polyolefin, which may be included in the fifth layer.

In one or more embodiments, the first layer may include a linear low density polyethylene (LLDPE) having a density from 0.905 $g/cm^3$ to 0.930 $g/cm^3$ when measured according to ASTM D792. In another embodiment, the density of the linear low density polyethylene may be from 0.905 $g/cm^3$ to 0.925 $g/cm^3$, from 0.905 $g/cm^3$ to 0.920 $g/cm^3$, from 0.905 $g/cm^3$ to 0.915 $g/cm^3$, from 0.905 $g/cm^3$ to 0.910 $g/cm^3$, from 0.910 $g/cm^3$ to 0.930 $g/cm^3$, from 0.910 $g/cm^3$ to 0.925 $g/cm^3$, from 0.910 $g/cm^3$ to 0.920 $g/cm^3$, from 0.910 $g/cm^3$ to 0.915 $g/cm^3$, from 0.915 $g/cm^3$ to 0.930 $g/cm^3$, from 0.915 $g/cm^3$ to 0.925 $g/cm^3$, from 0.915 $g/cm^3$ to 0.920 $g/cm^3$, from 0.920 $g/cm^3$ to 0.930 $g/cm^3$, from 0.920 $g/cm^3$ to 0.925 $g/cm^3$, from 0.925 $g/cm^3$ to 0.930 $g/cm^3$.

In one or more embodiments, the linear low density polyethylene (LLDPE) of the first layer may have a melt index ($I_2$) from 0.2 grams per 10 minutes (g/10 min) to 2.0 g/10 min when measured according to ASTM D1238. It is also contemplated that the melt index ($I_2$) of the linear low density polyethylene may be from 0.2 g/10 min to 1.5 g/10 min, from 0.2 g/10 min to 1.0 g/10 min, or from 0.2 g/10 min to 0.5 g/10 min, from 0.5 g/10 min to 2.0 g/10 min, from 0.5 g/10 min to 1.5 g/10 min, from 0.5 g/10 min to 1.0 g/10 min, from 1.0 g/10 min to 2.0 g/10 min from 1.0 g/10 min to 1.5 g/10 min, or from 1.5 g/10 min to 2.0 g/10 min.

According to embodiments, the linear low density polyethylene of the first layer may have a molecular weight distribution, expressed as the ratio of the weight average molecular weight to number average molecular weight (Mw/Mn), in the range of from 3.5 to 5.5. In additional embodiments, the linear low density polyethylene of the first layer may have a molecular weight distribution in the range from 3.5 to 4.5 or from 4.5 to 5.5.

According to one or more additional embodiments, the linear low polyethylene of the first layer may have a zero shear viscosity ratio of from 1.2 to 3.0, when measured according to the test methods described herein. In other embodiments, the linear low density polyethylene of the first layer may have a zero shear viscosity ratio of from 1.2 to 2.5, from 1.2 to 2.0, from 2.0 to 3.0, from 2.0 to 2.5, or from 2.5 to 3.0.

Various methodologies are contemplated for producing linear low density polyethylenes. For example, linear low density polyethylene resins may be made using Ziegler-Natta catalyst systems, resin made using single-site catalysts including, but not limited to, bis-metallocene catalysts and constrained geometry catalysts, and resin made using post-metallocene molecular catalysts. Linear low density polyethylene resins may include linear, substantially linear or heterogeneous polyethylene copolymers or homopolymers. Linear low density polyethylene resins may contain less long chain branching than LDPEs and include substantially linear polyethylenes, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or 5,854,045). Linear low density polyethylene resins may be made via gas-phase, solution-phase or slurry polymerization or any combination thereof, using any type of reactor or reactor configuration known in the art.

In one or more embodiments, the first layer comprises greater than 50% by weight linear low density polyethylene, based on the total weight of the first layer. In some embodiments, the first layer includes from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of LLDPE, based on the total weight of the first layer.

Optionally, in some embodiments, the first layer may include a low density polyethylene (LDPE). In one or more embodiments, the low density polyethylene of the first layer may have a melt index from 0.1 g/10 min to 10.0 g/10 min when measured according to ASTM D1238 at a load of 2.16 kg and temperature of 190° C. In other embodiments, the low density polyethylene of the first layer may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene of the first layer may have a density of from 0.916 g/cm$^3$ to 0.935 g/cm$^3$ when measured according to ASTM D792. In another embodiment, the low density polyethylene of the first layer may a density from 0.916 g/cm$^3$ to 0.925 g/cm$^3$.

In one or more embodiments, the first layer comprises less than 50% by weight low density polyethylene, based on the total weight of the first layer. In some embodiments, the first layer includes from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the first layer.

Second Layer

As stated previously, the presently-disclosed multilayer films may include a second layer. In the multilayer film designated as five-layer structure, A/B/C/D/E, the second layer may be designated as B. In some embodiments, the second layer may be referred to as an "inner layer." In further embodiments, the second layer may be in direct contact with one or both of the first layer and the third layer.

The second layer of the multilayer films of the present disclosure can have a variety of thicknesses. The thickness of the second layer may depend on a number of factors including, for example, the composition of the second layer, the desired overall properties of the multilayer film, the desired end-use application of the multilayer film, the manufacturing process of the multilayer film, and others. In embodiments, the second layer may have a thickness of from 0.5 micrometers (μm or microns) to 50 μm. In other embodiments, the second layer may have a thickness of from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The second layer of the multilayer films disclosed herein may make up from 5 wt. % to 40 wt. % of the total weight of the multilayer film. In some embodiments, the second layer may make up from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film.

In various embodiments, the second layer may include one or more materials that impart properties that enhance the stiffness of the multilayer film. In embodiments, the second layer may include a second polyolefin. In some embodiments, the second polyolefin may be the same as the fourth polyolefin, which may be included in the fourth layer.

In one or more embodiments, the second polyolefin may include a high density polyethylene (HDPE) having a density from 0.935 g/cm$^3$ and up to about 0.980 g/cm$^3$ when measured according to ASTM D792. In another embodiment, the high density polyethylene may a density from 0.935 g/cm$^3$ to 0.970 g/cm$^3$, from 0.935 g/cm$^3$ to 0.960 g/cm$^3$, from 0.935 g/cm$^3$ to 0.950 g/cm$^3$, from 0.935 g/cm$^3$ to 0.940 g/cm$^3$, from 0.940 g/cm$^3$ to 0.980 g/cm$^3$, from 0.940 g/cm$^3$ to 0.970 g/cm$^3$, from 0.940 g/cm$^3$ to 0.960 g/cm$^3$, from 0.940 g/cm$^3$ to 0.950 g/cm$^3$, from 0.950 g/cm$^3$ to 0.980 g/cm$^3$, from 0.950 g/cm$^3$ to 0.970 g/cm$^3$, from 0.950 g/cm$^3$ to 0.960 g/cm$^3$, from 0.960 g/cm$^3$ to 0.980 g/cm$^3$, from 0.960 g/cm$^3$ to 0.970 g/cm$^3$, or from 0.970 g/cm$^3$ to 0.980 g/cm$^3$.

In one or more embodiments, the second polyolefin may include a high density polyethylene having a melt index ($I_2$) from 0.1 grams per 10 minutes (g/10 min) to 10.0 g/10 min when measured according to ASTM D1238 at a load of 2.16 kg and temperature of 190° C. It is also contemplated that the melt index ($I_2$) of the high density polyethylene may be from 0.1 g/10 min to 5.0 g/10 min, from 0.1 g/10 min to 1.0 g/10 min, or from 1.0 g/10 min to 10.0 g/10 min, from 1.0 g/10 min to 5.0 g/10 min, or from 5.0 g/10 min to 10.0 g/10 min.

Various methodologies are contemplated for producing high density polyethylene. For example, high density polyethylene resins may be made using Ziegler-Natta catalyst systems, chrome catalysts or single-site catalysts including, but not limited to, bis-metallocene catalysts and constrained geometry catalysts.

In one or more embodiments, the second layer comprises greater than 50% by weight high density polyethylene, based on the total weight of the second layer. In some embodiments, the second layer includes from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of high density polyethylene, based on the total weight of the second layer.

Optionally, in some embodiments, the second layer may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In additional embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm$^3$ to 0.935 g/cm$^3$ when measured according to ASTM D792. In another embodiment, the low density polyethylene may a density from 0.916 g/cm$^3$ to 0.925 g/cm$^3$.

In one or more embodiments, the second layer comprises less than 50% by weight low density polyethylene, based on the total weight of the second layer. In some embodiments, the second layer includes from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the second layer.

Third Layer

As stated previously, the presently-disclosed multilayer films may include a third layer. In the multilayer film designated as five-layer structure, A/B/C/D/E, the third layer may be designated as C. In some embodiments, the third layer may be referred to as a "core layer." In further embodiments, the third layer may be in direct contact with one or both of the second layer and the fourth layer.

The third layer of the multilayer films of the present disclosure can have a variety of thicknesses. The thickness of the third layer may depend on a number of factors including, for example, the composition of the third layer, the desired overall properties of the multilayer film, the desired end-use application of the multilayer film, the manufacturing process of the multilayer film, and others. In embodiments, the third layer may have a thickness of from 0.5 micrometers (μm or microns) to 50 μm. In other embodiments, the third layer may have a thickness of from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The third layer of the multilayer films may make up from 5 wt. % to 40 wt. % of the total weight of the multilayer film. In some embodiments, the third layer may make up from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film.

In various embodiments, the third layer may include one or more materials that impart properties into the multilayer film that providing for a good balance of toughness and tear strength. In embodiments, the third layer may include a third polyolefin. In embodiments, the third polyolefin may be a polyethylene composition, as described in more detail subsequently in this disclosure.

In one or more embodiments, the third layer comprises greater than 50% by weight of the polyethylene composition, based on the total weight of the third layer. In some embodiments, the third layer includes from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of the polyethylene composition, based on the total weight of the third layer.

Optionally, in some embodiments, the third layer may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In other embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm$^3$ to 0.935 g/cm$^3$ when measured according to ASTM D792. In another embodiment, the low density polyethylene may a density from 0.916 g/cm$^3$ to 0.925 g/cm$^3$.

In one or more embodiments, the third layer comprises less than 50% by weight low density polyethylene, based on the total weight of the third layer. In some embodiments, the first layer includes from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the third layer.

Fourth Layer

As stated previously, the presently-disclosed multilayer films may include a fourth layer. In the multilayer film designated as five-layer structure, A/B/C/D/E, the fourth layer may be designated as D. In some embodiments, the fourth layer may be referred to as an "inner layer." In further embodiments, the fourth layer may be in direct contact with one or both of the third layer and the fifth layer.

The fourth layer of the multilayer films of the present disclosure can have a variety of thicknesses. The thickness of the fourth layer may depend on a number of factors including, for example, the composition of the fourth layer, the desired overall properties of the multilayer film, the desired end-use application of the multilayer film, the manufacturing process of the multilayer film, and others. In embodiments, the fourth layer may have a thickness of from 0.5 micrometers (μm or microns) to 50 μm. In other embodiments, the fourth layer may have a thickness of from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The fourth layer of the multilayer films may make up from 5 wt. % to 40 wt. % of the total weight of the multilayer film. In some embodiments, the fourth layer may make up from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film.

In various embodiments, the fourth layer may include one or more materials that impart properties that enhance the stiffness of the multilayer film. In embodiments, the fourth layer may include a fourth polyolefin. In some embodiments, the fourth polyolefin may be the same as the second polyolefin, which may be included in the second layer.

In one or more embodiments, the fourth polyolefin may include a high density polyethylene (HDPE) having a density from 0.935 g/cm$^3$ and up to about 0.980 g/cm$^3$ when measured according to ASTM D792. In another embodiment, the high density polyethylene may a density from 0.935 g/cm$^3$ to 0.970 g/cm$^3$, from 0.935 g/cm$^3$ to 0.960 g/cm$^3$, from 0.935 g/cm$^3$ to 0.950 g/cm$^3$, from 0.935 g/cm$^3$ to 0.940 g/cm$^3$, from 0.940 g/cm$^3$ to 0.980 g/cm$^3$, from 0.940 g/cm$^3$ to 0.970 g/cm$^3$, from 0.940 g/cm$^3$ to 0.960 g/cm$^3$, from 0.940 g/cm$^3$ to 0.950 g/cm$^3$, from 0.950 g/cm$^3$ to 0.980 g/cm$^3$, from 0.950 g/cm$^3$ to 0.970 g/cm$^3$, from 0.950 g/cm$^3$ to 0.960 g/cm$^3$, from 0.960 g/cm$^3$ to 0.980 g/cm$^3$, from 0.960 g/cm$^3$ to 0.970 g/cm$^3$, or from 0.970 g/cm$^3$ to 0.980 g/cm$^3$.

In one or more embodiments, the fourth polyolefin may include a high density polyethylene having a melt index ($I_2$) from 0.1 grams per 10 minutes (g/10 min) to 10.0 g/10 min when measured according to ASTM D1238 at a load of 2.16 kg and temperature of 190° C. It is also contemplated that the melt index ($I_2$) of the linear low density polyethylene may be from 0.1 g/10 min to 5.0 g/10 min, from 0.1 g/10 min to 1.0 g/10 min, or from 1.0 g/10 min to 10.0 g/10 min, from 1.0 g/10 min to 5.0 g/10 min, or from 5.0 g/10 min to 10.0 g/10 min.

Various methodologies are contemplated for producing high density polyethylene. For example, high density polyethylene resins may be made using Ziegler-Natta catalyst systems, chrome catalysts or single-site catalysts including, but not limited to, bis-metallocene catalysts and constrained geometry catalysts.

In one or more embodiments, the fourth layer comprises greater than 50% by weight high density polyethylene, based on the total weight of the fourth layer. In some embodiments, the fourth layer includes from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of high density polyethylene, based on the total weight of the fourth layer.

Optionally, in some embodiments, the fourth layer may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In additional embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm$^3$ to 0.935 g/cm$^3$ when measured according to ASTM D792. In another embodiment, the low density polyethylene may a density from 0.916 g/cm$^3$ to 0.925 g/cm$^3$.

In one or more embodiments, the fourth layer comprises less than 50% by weight low density polyethylene, based on the total weight of the first layer. In some embodiments, the fourth layer includes from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the fourth layer.

Fifth Layer

As stated previously, the presently-disclosed multilayer films may include a fifth layer. In the multilayer film designated as five-layer structure, A/B/C/D/E, the fifth layer may be designated as E. In some embodiments, the fifth layer may be referred to as a "skin layer." In further embodiments, the fifth layer may be one of the outermost layers of the multilayer film. In further embodiments, the fifth layer may be in direct contact with the fourth layer.

The fifth layer of the multilayer films of the present disclosure can have a variety of thicknesses. The thickness of the fifth layer may depend on a number of factors including, for example, the composition of the fifth layer, the desired overall properties of the multilayer film, the desired end-use application of the multilayer film, the manufacturing process of the multilayer film, and others. In embodiments, the fifth layer may have a thickness of from 0.5 micrometers (μm or microns) to 50 μm. In other embodiments, the fifth layer may have a thickness of from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The fifth layer of the multilayer films may make up from 5 wt. % to 40 wt. % of the total weight of the multilayer film. In some embodiments, the fifth layer may make up from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film.

In various embodiments, the fifth layer may include one or more materials that impart properties into the multilayer film that aid in stretch, processability, and others. In embodiments, the fifth layer may include a fifth polyolefin. In some embodiments, the fifth polyolefin may be the same as the first polyolefin, which may be included in the first layer.

In one or more embodiments, the fifth polyolefin may include a linear low density polyethylene (LLDPE) having a density from 0.905 g/cm$^3$ to 0.930 g/cm$^3$ when measured according to ASTM D792. In another embodiment, the density of the linear low density polyethylene of the fifth layer may be from 0.905 g/cm$^3$ to 0.925 g/cm$^3$, from 0.905 g/cm$^3$ to 0.920 g/cm$^3$, from 0.905 g/cm$^3$ to 0.915 g/cm$^3$, from 0.905 g/cm$^3$ to 0.910 g/cm$^3$, from 0.910 g/cm$^3$ to 0.930 g/cm$^3$, from 0.910 g/cm$^3$ to 0.925 g/cm$^3$, from 0.910 g/cm$^3$ to 0.920 g/cm$^3$, from 0.910 g/cm$^3$ to 0.915 g/cm$^3$, from 0.915 g/cm$^3$ to 0.930 g/cm$^3$, from 0.915 g/cm$^3$ to 0.925 g/cm$^3$, from 0.915 g/cm$^3$ to 0.920 g/cm$^3$, from 0.920 g/cm$^3$ to 0.930 g/cm$^3$, from 0.920 g/cm$^3$ to 0.925 g/cm$^3$, from 0.925 g/cm$^3$ to 0.930 g/cm$^3$.

In one or more embodiments, the linear low density polyethylene (LLDPE) of the fifth layer having a melt index ($I_2$) from 0.2 grams per 10 minutes (g/10 min) to 2.0 g/10 min when measured according to ASTM D1238. It is also contemplated that the melt index ($I_2$) of the linear low density polyethylene of the fifth layer may be from 0.2 g/10 min to 1.5 g/10 min, from 0.2 g/10 min to 1.0 g/10 min, or from 0.2 g/10 min to 0.5 g/10 min, from 0.5 g/10 min to 2.0 g/10 min, from 0.5 g/10 min to 1.5 g/10 min, from 0.5 g/10 min to 1.0 g/10 min, from 1.0 g/10 min to 2.0 g/10 min from 1.0 g/10 min to 1.5 g/10 min, or from 1.5 g/10 min to 2.0 g/10 min.

According to embodiments, the linear low density polyethylene of the fifth layer may have a molecular weight distribution, expressed as the ratio of the weight average molecular weight to number average molecular weight (Mw/Mn), in the range of from 3.5 to 5.5. In additional embodiments, the linear low density polyethylene may have a molecular weight distribution in the range from 3.5 to 4.5 or from 4.5 to 5.5.

According to embodiments, the linear low density polyethylene of the fifth layer may have a Molecular Weighted Comonomer Distribution Index (MWCDI) value greater than 0.9. In other embodiment, the linear low density polyethylene may have a MWCDI value from 0.9 to 10, from 1.0 to 10, from 1.0 to 8.0, from 1.0 to 6.0, from 1.0 to 4.0, from 1.0 to 2.0, from 2.0 to 10, from 2.0 to 8.0, from 2.0 to 6.0, from 2.0 to 4.0, from 4.0 to 10, from 4.0 to 8.0, from 4.0 to 6.0, from 6.0 to 10, from 6.0 to 8.0, or from 8.0 to 10.

The linear low density polyethylene of the fifth layer may have a melt index ratio ($I_{10}/I_2$) that meets the following equation: $I_{10}/I_2 \geq 7.0-1.2 \times \log (I_2)$. In yet another embodiment, the linear low density polyethylene of the fifth layer may have a melt index ratio $I_{10}/I_2$ greater than or equal to 7.0, greater than, or equal to 7.1, greater than or equal to 7.2, greater than or equal to 7.3. In one embodiment, the linear low density polyethylene of the fifth layer may have a melt index ratio $I_{10}/I_2$ less than or equal to 9.2, less than or equal to 9.0, less than or equal to 8.8, or even less than or equal to 8.5.

According to one or more additional embodiments, the linear low density polyethylene of the fifth layer may have a zero shear viscosity ratio of from 1.2 to 3.0, when measured according to the test methods described herein. In other embodiments, the linear low density polyethylene may have a zero shear viscosity ratio of from 1.2 to 2.5, from 1.2 to 2.0, from 2.0 to 3.0, from 2.0 to 2.5, or from 2.5 to 3.0.

Various methodologies are contemplated for producing linear low density polyethylenes. For example, linear low density polyethylene resins may be made using Ziegler-Natta catalyst systems, resin made using single-site catalysts including, but not limited to, bis-metallocene catalysts and constrained geometry catalysts, and resin made using post-metallocene molecular catalysts. Linear low density polyethylene resins may include linear, substantially linear or heterogeneous polyethylene copolymers or homopolymers. Linear low density polyethylene resins may contain less long chain branching than LDPEs and include substantially linear polyethylenes, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or 5,854,045). Linear low density polyethylene resins may be made via gas-phase, solution-phase or slurry polymerization or any combination thereof, using any type of reactor or reactor configuration known in the art.

In one or more embodiments, the fifth layer comprises greater than 50% by weight linear low density polyethylene, based on the total weight of the fifth layer. In some embodiments, the fifth layer includes from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of LLDPE, based on the total weight of the fifth layer.

Optionally, in some embodiments, the fifth layer may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In other embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm³ to 0.935 g/cm³ when measured according to ASTM D792. In another embodiment, the low density polyethylene may a density from 0.916 g/cm³ to 0.925 g/cm³.

In one or more embodiments, the fifth layer comprises less than 50% by weight low density polyethylene, based on the total weight of the fifth layer. In some embodiments, the fifth layer includes from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the fifth layer.

Additional Layers

As stated previously, in some embodiments, the multilayer film may include one or more additional layers. In some embodiments, a multilayer film of the present disclosure may comprise up to 11, 13, 15, or more layers.

The one or more additional layers may include one or more materials that impart properties into the multilayer film that aid in stretch, processability, stiffness, and others. In embodiments, the one or more additional layers may include one or more polyolefins. In some embodiments, the include one or more polyolefins may include one or more polyethylenes having a density of from 0.900 g/cm³ to 0.970 g/cm³. In some embodiments, the one or more polyethylenes of the one or more additional layers may include an LLDPE, an HDPE, an MDPE, LDPE, the polyethylene compositions, or combinations.

In some embodiments, the multilayer films may optionally include tie layers to facilitate adhesion between layers. In some such embodiments, the tie layers may comprise a maleic anhydride grafted polyethylene or other functionalized resins that are known to be useful as tie layers. A suitable commercial example of the maleic anhydride grafted polyethylene is AMPLIFY™ TY 1057 from The Dow Chemical Company (Midland, Mich.), and others known to those of skill in the art can also be used.

In some embodiments, the multilayer films may optionally include barrier. Suitable barrier layers may be chosen from layers comprising ethylene vinyl alcohol copolymer, cyclic olefin copolymers, polyvinyl acetate, or blends of one or more of these polymers with polyethylene, polyvinyl alcohol, or polyamide.

Polyethylene Compositions (A) Polyethylene Composition and Characterization

In one or more embodiments, the polyethylene composition may have a density of 0.924 g/cm³ to 0.936 g/cm³. For example, embodiments of the presently disclosed polyethylene compositions may have densities of from 0.924 g/cm³ to 0.931 g/cm³, from 0.924 g/cm³ to 0.928 g/cm³, from 0.927 g/cm³ to 0.931 g/cm³, or from 0.929 g/cm³ to 0.933 g/cm³. According to additional embodiments, the polyethylene composition may have a density of from 0.924 to 0.928, from 0.928 g/cm³ to 0.932 g/cm³, from 0.932 g/cm³ to 0.936 g/cm³, or any combination of these ranges.

In one or more embodiments, the polyethylene composition may have a melt index ($I_2$) of 0.25 g/10 minutes to 2.0 g/10 minutes, such as 0.5 g/10 minutes to 1.2 g/10 minutes. For example, in one or more embodiments, the polyethylene composition may have a melt index ($I_2$) of from 0.25 g/10 minutes to 0.5 g/10 minutes, from 0.5 g/10 minutes to 0.7 g/10 minutes, from 0.7 g/10 minutes to 0.9 g/10 minutes, from 0.59 g/10 minutes to 1.1 g/10 minutes, from 1.1 g/10 minutes to 1.3 g/10 minutes, from 1.3 g/10 minutes to 1.5 g/10 minutes, from 1.5 g/10 minutes to 1.7 g/10 minutes, from 1.7 g/10 minutes to 2.0 g/10 minutes, or any combination of these ranges. According to additional embodiments, the polyethylene composition may have a melt index ($I_2$) of from 0.65 g/10 minutes to 1.05 g/10 minutes.

According to embodiments, the polyethylene compositions may have a molecular weight distribution, expressed as the ratio of the weight average molecular weight to number average molecular weight (Mw/Mn), in the range of from 2.5 to 8.0. For example, the polyethylene composition may have a molecular weight distribution of from 2.5 to 3.0, from 3.0 to 3.5, from 3.5 to 4.0, from 4.0 to 4.5, from 4.5 to 5.0, from 5.0 to 5.5, from 5.5 to 6.0, from 6.0 to 6.5, from 6.5 to 7.0, from 7.0 to 7.5, from 7.5 to 8.0, or any combination of these ranges. In additional embodiments, the polyethylene composition may have a molecular weight distribution of from 3.0 to 5.0. As presently described, the molecular weight distribution may be calculated according to gel permeation chromatography (GPC) techniques as described herein.

According to one or more additional embodiments, the polyethylene composition may have a zero shear viscosity ratio of less than 3.0. For example, the polyethylene composition may have a zero shear viscosity ratio of less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or even less than 1.1. In one or more embodiments, the polyethylene composition may have a zero shear viscosity ratio of at least 1.0.

As described herein, a polyethylene "fraction" refers to a portion of the total composition of the polyethylene composition. The presently disclosed embodiments include at least a "first polyethylene fraction" and a "second polyethylene fraction." The various fractions included in the polyethylene composition may be quantified by their temperature range in an elution profile via improved comonomers composition distribution (iCCD) analysis method. Unless specified, any elution profile referred to herein is the elution profile observed via iCCD. Examples of such fractions will be better understood in view of the examples provided herewith. In general, the first fraction may include a single peak in the temperature range of the first fraction and the second fraction may include a single peak in the temperature range of the second fraction. The polyethylene compositions described herein may be referred to as "multimodal," meaning that they include at least two peaks in their elution profile. Some embodiments may be "bimodal," meaning that two major peaks are present.

In reference to the described iCCD distribution, FIG. 1 schematically depicts a sample iCCD distribution 100 along with the cumulative weight fraction curve 200. FIG. 1 depicts, generally, several features of the iCCD profiles of the presently described polyethylene compositions, such as the first fraction, the second fraction, half peak widths, etc., which are discussed in detail herein. As such, FIG. 1 can be used as a reference with respect to the disclosures related the iCCD profile provided herein. Specifically, the first fraction 102 and second fraction 106 are depicted. The first fraction 102 has a peak 104 and the second fraction 106 has a peak 108. Each fraction has a half peak width 110 and 112. It should be understood that the profile of FIG. 1 is not derived from experimentation or observation, but is instead supplied for informational purposes of describing particular features of an iCCD elution profile.

In one or more embodiments, the first polyethylene fraction may have a single peak in a temperature range of 45° C. to 87° C. in an elution profile via iCCD. As used herein, a "single peak" refers to an iCCD wherein a particular fraction include only a single peak. That is, in some embodiments, the iCCD of the first and second polyethylene fraction includes only an upward sloping region followed by a downward sloping region to form the single peak. In one or more embodiments, the single peak of the first polyethylene fraction may be in a temperature range of from 60° C. to 85° C., such as from 70° C. to 85° C. Without being bound by theory, it is believed that in at least some embodiments of the presently disclosed polyethylene composition where a dual reactor design is used for polymerization, a combination of higher density crystalline domain and lower density amorphous domain may exist. The impact strength is controlled predominantly by the amorphous region or the tie concentrations that connect the adjacent lamellae. The relative tie chain concentration is estimated to be relatively large when the density is less than 0.910 g/cm³. The peak of the first polymer fraction in the presently disclosed compositions may lie in the temperature range of 60° C. to 85° C., which may provide greater tie-chain concentration for functional benefits such as improved toughness.

It should be understood that a peak in the first or second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the second polyethylene fraction may have a single peak in the temperature range of 95° C. to 120° C. in the elution profile via iCCD. The temperature range of the second polyethylene fraction of 95° C. to 120° C. may be desirable because the low molecular weight, high density component at 95° C. to 120° C. may allow the polyethylene to achieve higher overall density while maintaining a lower density fraction as described by the ratio of these two fractions.

In one or more embodiments, the width of the single peak of the second polyethylene fraction at 50 percent peak height may be less than 5.0° C., less than 4° C., or even less than 3° C. Generally, lesser temperature ranges at 50 percent peak heights correspond to a "sharper" peak. Without being bound by any particular theory, it is believed that a "sharper" or "narrower" peak is a characteristic caused by the molecular catalyst and indicates minimum comnomer incorporation on the higher density fraction, enabling higher density split between the two fractions.

In one or more embodiments, the polyethylene composition may have a local minimum in an elution profile via iCCD in a temperature range of from 80° C. to 90° C. This local minimum may fall between the peaks of the first polyethylene fraction and the second polyethylene fraction.

In embodiments described herein, the first polyethylene fraction area is the area in the elution profile between 45° C. and 87° C., beneath the single peak of the first polyethylene fraction. Similarly, the second polyethylene fraction area is the area in the elution profile between 95° C. and 120° C., beneath the single peak of the second polyethylene fraction. The first polyethylene fraction area and the second polyethylene fraction, respectively, may correspond generally with the total relative mass of each polymer fraction in the polyethylene composition. In general, a polyethylene fraction area in an iCCD profile may be determined by integrating the iCCD profile between the starting and ending temperatures specified.

According to one or more embodiments, the difference between the single peak of the second polyethylene fraction and the single peak of the first polyethylene fraction may be at least 10° C. For example, the difference between the single peak of the second polyethylene fraction and the single peak of the first polyethylene fraction may be at least 12° C., 14° C., 16° C., 18° C., or even at least 20° C.

In one or more embodiments, the first polyethylene fraction area may comprise at least 40% of the total area of the elution profile (for example, at least 42%, at least 44%, at least 46%, at least 48%, at least 50%, at least 52%, or even at least 54% of the total area of the elution profile). For example, the first polyethylene fraction area may comprise from 40% to 65% of the total area of the elution profile, such as from 42% to 58%, from 43% to 45%, from 45% to 47%, from 53% to 55%, or from 55% to 57%.

According to one or more embodiments, the second polyethylene fraction area may comprise at least 25% of the total area of the elution profile (for example, at least 30%, at least 35%, or even at least 40% of the total area of the elution profile). For example, the first polyethylene fraction area may comprise from 20% to 50%, from 27% to 31% or from 41% to 48% of the total area of the elution profile.

According to some embodiments, a ratio of the first polyethylene fraction area to the second polyethylene fraction area may be from 0.75 to 2.5 (such as 0.75 to 1.0, 1.0 to 1.25, from 1.25 to 1.5, from 1.5 to 1.75, from 1.75 to 2.0, from 2.0 to 2.25, from 2.25 to 2.5, or any combination of these ranges).

In one or more embodiments, the polyethylene composition is formed from the polymerization of ethylene and a comonomers such as a C3-C12 alkene. Contemplated comonomers include C6-C9 alkenes, such as 1-octene and 1-hexene. In one or more embodiments the comonomers is 1-octene.

In one or more embodiments, the difference between the single peak of the second polyethylene fraction and the single peak of the first polyethylene fraction is at least 10° C., at least 12.5° C. at least 15° C., at least 17.5° C., or even at least 20° C.

In one or more embodiments, the first polyethylene fraction may have a melt index (I2) of 0.01 to 0.18 g/10 minutes. For example, according to one or more embodiments, the first polyethylene fraction may have a melt index (I2) of from 0.01 g/10 minutes to 0.03 g/10 minutes, from 0.03 g/10 minutes to 0.05 g/10 minutes, from 0.05 g/10 minutes to 0.07 g/10 minutes, from 0.07 g/10 minutes to 0.09 g/10 minutes, from 0.09 g/10 minutes to 0.11 g/10 minutes, from 0.11 g/10 minutes to 0.13 g/10 minutes, from 0.13 g/10 minutes to 0.15 g/10 minutes, from 0.15 g/10 minutes to 0.18 g/10 minutes, or any combination of these ranges.

In one or more embodiments, the second polyethylene fraction may have a melt index ($I_2$) of 1 to 10,000 g/10 minutes. For example, according to one or more embodiments, the second polyethylene fraction may have a melt index ($I_2$) of from 10 g/10 minutes to 1,000 g/10 minutes, from 20 g/10 minutes to 800 g/10 minutes, from 1 g/10 minutes to 100 g/10 minutes, from 100 g/10 minutes to 1,000 g/10 minutes, from 1,000 g/10 minutes to 10,000 g/10 minutes, or any combination of these ranges.

In one or more embodiments, the weight average molecular weight of the second polyethylene fraction may be less than or equal to 120,000 g/mol, such as from 20,000 g/mol to 120,000 g/mol, or from 40,000 g/mol to 65,000 g/mol. In additional embodiments, the weight average molecular weight of the second polyethylene fraction may be from 20,000 g/mol to 40,000 g/mol, from 40,000 g/mol to 60,000 g/mol, from 60,000 g/mol to 80,000 g/mol, from 80,000 g/mol to 100,000 g/mol, from 100,000 g/mol to 120,000 g/mol, or any combination of these ranges. Molecular weight of the polyethylene fractions may be calculated based on GPC results, as described hereinbelow.

The polyethylene compositions described herein may have relatively good dart strength when formed into monolayer blown films. According to one or more embodiments, a monolayer blown film formed from the polyethylene composition and having a thickness of two mils has a Dart drop impact of at least 1000 grams when measured according to ASTM D1709 Method A. In additional embodiments, a monolayer blown film formed from the polyethylene composition and having a thickness of two mils has a Dart drop impact of at least 1100 grams, at least 1200 grams, at least 1300 grams, at least 1400 grams, at least 1500 grams, at least 1600 grams, at least 1700 grams, at least 1800 grams, at least 1900 grams, or even at least 2000 grams when measured according to ASTM D1709 Method A.

According to additional embodiments, the polyethylene compositions may have Dow Rheology Index of less than or equal to 5, such as less than or equal to 4, less than or equal to 3, less than or equal to 2, or even less than or equal to 1.

In one or more embodiments, the presently disclosed polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The polyethylene compositions may contain from about 0.1 to about 10 percent by the combined weight of such additives, based on the weight of the polyethylene composition including such additives.

(B) Polymerization

Any conventional polymerization processes may be employed to produce the polyethylene compositions described herein. Such conventional polymerization processes include, but are not limited to, slurry polymerization processes, solution polymerization process, using one or more conventional reactors, e.g., loop reactors, isothermal reactors, stirred tank reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115 to 250° C. (e.g., from 115 to 210° C.), and at pressures in the range of from 300 to 1,000 psi (e.g., from 400 to 800 psi). In some embodiments, in a dual reactor, the temperature in the first reactor is in the range of from 115 to 190° C. (e.g., from 160 to 180° C.), and the second reactor temperature is in the range of 150 to 250° C. (e.g., from 180 to 220° C.). In other embodiments, in a single reactor, the temperature in the reactor is in the range of from 115 to 250° C. (e.g., from 115 to 225° C.).

The residence time in solution phase polymerization process may be in the range of from 2 to 30 minutes (e.g., from 5 to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the polyethylene composition and solvent is then removed from the reactor and the polyethylene composition is isolated. Solvent is typically recovered via a solvent recovery unit, e.g., heat exchangers and vapor liquid separator drum, and is then recycled back into the polymerization system.

In some embodiments, the polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the polyethylene composition may be produced via solution polymerization in a single reactor system, for example a single loop reactor system, wherein ethylene is polymerized in the presence of two catalyst systems. In some embodiments, only ethylene is polymerized.

(C) Catalyst Systems

Specific embodiments of catalyst systems that can, in one or more embodiments, be used to produce the polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl ($—C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom ($—H$) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C*HCH_3$, and —$(CH_2)_4C*(H)(CH_3)$—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2] octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si$(R^C)_2$, P$(R^P)$, N$(R^N)$, —N=C$(R^C)_2$, —Ge$(R^C)_2$—, or —Si$(R^C)$—, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si$(R^C)_2$-, $(C_1-C_{40})$hydrocarbyl-N$(R^N)$—, $(C_1-C_{40})$hydrocarbyl-P$(R^P)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, Ge$(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F⁻), chloride (Cl⁻), bromide (Br⁻), or iodide (I⁻).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

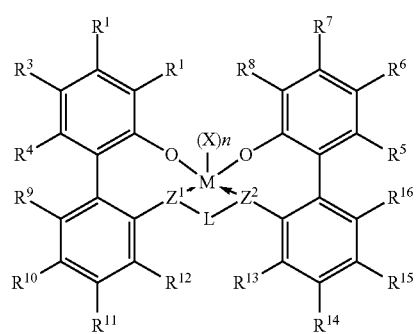
(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is $(C_1-C_{40})$hydrocarbylene or $(C_1-C_{40})$heterohydrocarbylene, wherein the $(C_1-C_{40})$hydrocarbylene has a portion that comprises a 1-carbon atom to 10-carbon atom linker backbone linking the two Z groups in Formula (I) (to which L is bonded) or the $(C_1-C_{40})$heterohydrocarbylene has a portion that comprises a 1-atom to 10-atom linker backbone linking the two Z groups in Formula (I), wherein each of the 1 to 10 atoms of the 1-atom to 10-atom linker backbone of the $(C_1-C_{40})$heterohydrocarbylene independently is a carbon atom or heteroatom, wherein each heteroatom independently is O, S, S(O), $S(O)_2$, $Si(R^C)_2$, $Ge(R^C)_2$, $P(R^C)$, or $N(R^C)$, wherein independently each $R^C$ is $(C_1-C_{30})$hydrocarbyl or $(C_1-C_{30})$heterohydrocarbyl; $R^1$ and $R^8$ are independently selected from the group consisting of —H, $(C_1-C_{40})$hydrocarbyl, $(C_1-C_{40})$heterohydrocarbyl, —Si($R^C)_3$, —Ge($R^C)_3$, —P($R^P)_2$, —N($R^N)_2$, —$OR^C$, —$SR^C$, —$NO_2$, —CN, —$CF_3$, $R^CS(O)$—, $R^CS(O)_2$—, $(R^C)_2$C=N—, $R^CC(O)O$—, $R^COC(O)$—, $R^CC(O)N(R^N)$—, $(R^N)_2NC(O)$—, halogen, and radicals having formula (II), formula (III), or formula (IV):

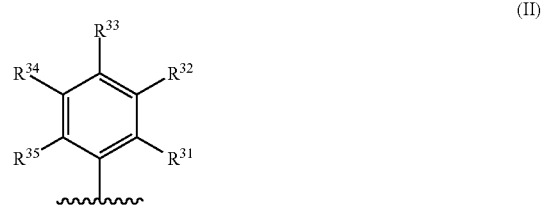
(II)

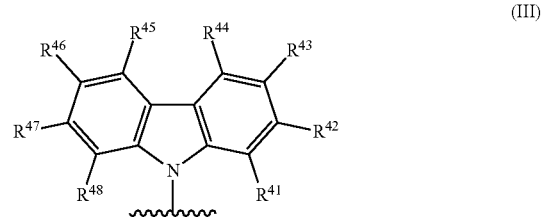
(III)

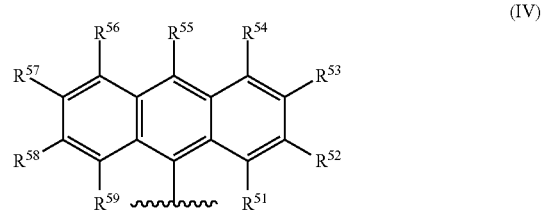
(IV)

In formulas (II), (III), and (IV), each of $R^{31-35}$, $R^{41-48}$, or $R^{51-59}$ is independently chosen from $(C_1-C_{40})$hydrocarbyl, $(C_1-C_{40})$heterohydrocarbyl, —Si($R^C)_3$, —Ge($R^C)_3$, —P($R^P)_2$, —N($R^N)_2$, —N=$CHR^C$, —$OR^C$, —$SR^C$, —$NO_2$, —CN, —$CF_3$, $R^CS(O)$—, $R^CS(O)_2$—, $(R^C)_2$C=N—, $R^CC(O)O$—, $R^COC(O)$—, $R^CC(O)N(R^N)$—, $(R^N)_2NC(O)$—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from $(C_1-C_{40})$hydrocarbyl, $(C_1-C_{40})$heterohydrocarbyl, —Si($R^C)_3$, —Ge($R^C)_3$, —P($R^P)_2$, —N($R^N)_2$, —N=$CHR^C$, —$OR^C$, —$SR^C$, —$NO_2$, —CN, —$CF_3$, $R^CS$ (O)—, $R^CS(O)_2$—, $(R^C)_2C=N$—, $R^CC(O)O$—, $R^COC(O)$—, $R^CC(O)N(R^N)$—, $(R^C)_2NC(O)$—, Halogen, and —H.

In some embodiments, the polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3'',5, 5''-tris(1,1-dimethylethyl)-5'-octyl[1,1':3',1''-terphenyl]-2'-olato-κO]]](2-)]dimethyl-, having the chemical formula $C_{86}H_{128}F_2GeO_4Zr$ and the following structure (V):

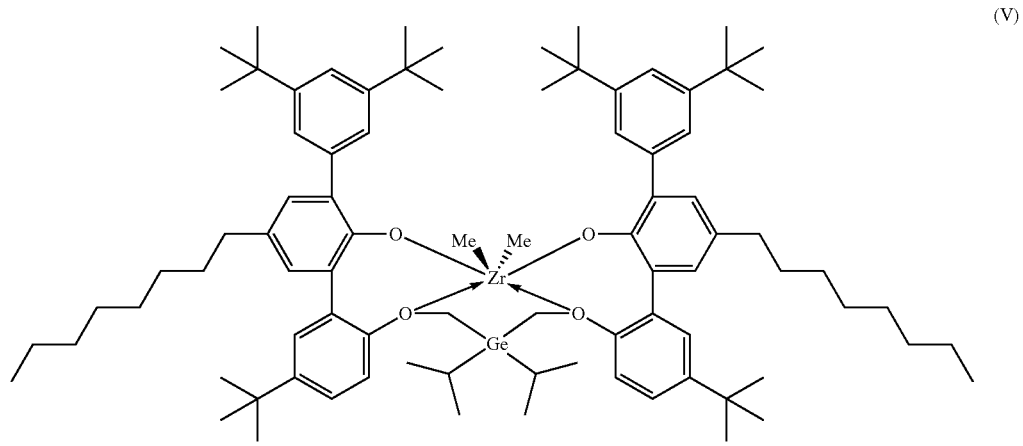

(V)

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1']-biphenyl]-2-olato-κO]](2-)]dimethyl, having the chemical formula $C_{107}H_{154}N_2O_4Si_2Zr$ and the following structure (VI):

technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 ($C_1$-$C_{20}$)hydrocar- (VI)

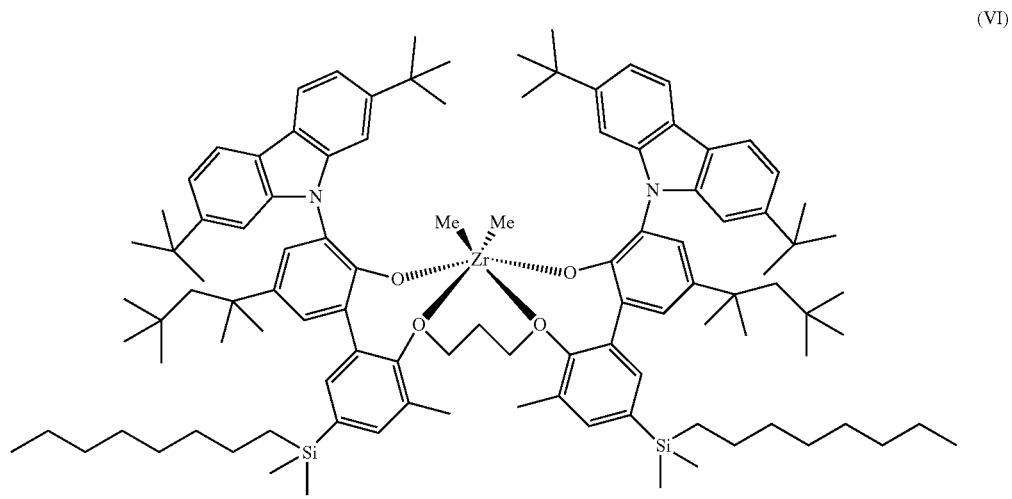

(D) Co-Catalyst Component

The catalyst system comprising a metal-ligand complex of formula (I) may be rendered catalytically active by any byl substituents as described herein. In one embodiment, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis (pentafluorophenyl)borane). As used herein, the term "ammonium" means a nitrogen cation that is a (($C_1$-$C_{20}$) hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activators (co-catalysts) include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Methods of Producing the Presently-Described Multilayer Films

Various methodologies are contemplated for producing the multilayer films. In one or more embodiments, the process of manufacturing the multilayer film may include cast film extrusion or blown film extrusion.

In some embodiments, the process of manufacturing the multilayer film may include forming a blown film bubble. In some embodiments, the blown film bubble may be a multilayer blown film bubble. Further in accordance with this embodiment, the multilayer blown film bubble may include at least five layers (in accordance with the first layer, the second layer, the third layer, the fourth layer, and the fifth layer described herein), and the at least five layers may adhere to each other. In some embodiments, each of the first layer and the fifth layer may include a linear low density polyethylene, the second layer and the fourth layer may include a high density polyethylene, and the third layer may include the polyethylene composition as described previously in this disclosure.

During embodiments of the blown film process, an extruded film from an extruder die may be formed (blown) and pulled up a tower onto a nip. The film may then be wound onto a core. Before the film is wound onto the core, the ends of the film may be cut and folded using folding equipment. This makes the layers of the film difficult to separate, which may be important for shipping applications, generally, or heavy duty shipping sack applications.

In further embodiments, the blown film bubble may be formed via a blown film extrusion line having a length to diameter ("L/D") ratio of from 30 to 1. In some embodiments, the extrusion line may have a blow up ratio of from about 1 to about 5, from about 1 to about 3, from about 2 to about 5, or from about 2 to about 3. In some embodiments, the extrusion line may utilize a die with internal bubble cooling. In some embodiments, the die gap may be from about 1 millimeter (mm) to about 5 mm, from about 1 mm to about 3 mm, from about 2 mm to about 5 mm, or from about 2 mm to about 3 mm.

In some embodiments, the extrusion line may utilize a film thickness gauge scanner. In some embodiments, during the extrusion process, the multilayer film thickness may be maintained at about from about 15 μm or to 115 μm. In other embodiments, the multilayer film thickness may be maintained at about from 15 μm to 100 μm, from 15 μm to 75 μm, from 15 μm to 50 μm, from 15 μm to 25 μm, from 25 μm to 115 μm, from 25 μm to 100 μm, from 25 μm to 75 μm, from 25 μm to 50 μm, from 50 μm to 115 μm, from 50 μm to 100 μm, from 50 μm to 75 μm, from 75 μm to 115 μm, from 75 μm to 100 μm, or from 100 μm to 115 μm.

In some embodiments, the forming of the multilayer blown film bubble step may occur at a temperature of from 350 to 500° F., or from 375 to 475° F. The output speed may be from about 5 lb/hr/in to about 25 lb/hr/in, from about 5 lb/hr/in to about 20 lb/hr/in, from about 5 lb/hr/in to about 15 lb/hr/in, from about 5 lb/hr/in to about 10 lb/hr/in, from about 10 lb/hr/in to about 25 lb/hr/in, from about 10 lb/hr/in to about 20 lb/hr/in, from about 10 lb/hr/in to about 15 lb/hr/in, from about 15 lb/hr/in to about 25 lb/hr/in, from about 15 lb/hr/in to about 20 lb/hr/in, or from about 20 lb/hr/in to about 25 lb/hr/in.

Articles

Embodiments of the present disclosure also relate to articles, such as packages, formed from the multilayer films of the present disclosure. Such packages can be formed from any of the multilayer films of the present disclosure described herein. Multilayer films of the present disclosure are particularly useful in articles where good tear strength and dart strength are desired.

Examples of such articles can include flexible packages, pouches, stand-up pouches, and pre-made packages or pouches. In some embodiments, multilayer films or laminates of the present disclosure can be used for heavy duty shipping sacks. In some embodiments, one or more of the foregoing heavy duty shipping sacks may be utilized in shipping applications.

Various methods of producing embodiments of articles from the multilayer films disclosed herein would be familiar to one of ordinary skill in the art.

Test Methods

The test methods include the following:

Melt Index

Melt indices $I_2$ (or I2) and $I_{10}$ (or I10) of polymer samples were measured in accordance to ASTM D-1238 (method B) at 190° C. and at 2.16 kg and 10 kg load, respectively. Their values are reported in g/10 min. Fractions of polymer samples were measured by collecting product polymer from the reactor which produces that specific fraction or portion of the polymer composition. For example, the first polyethylene fraction can be collected from the reactor producing the lower density, higher molecular weight component of the polymer composition. The polymer solution is dried under vacuum before the melt index measurement.

Density

Samples for density measurement were prepared according to ASTM D4703. Measurements were made, according to ASTM D792, Method B, within one hour of sample pressing.

ASTM D1709 Dart Drop

The film Dart Drop test determines the energy that causes plastic film to fail under specified conditions of impact by a free falling dart. The test result is the energy, expressed in terms of the weight of the missile falling from a specified height, which would result in failure of 50% of the specimens tested.

After the film is produce, it is conditioned for at least 40 hours at 23° C. (+/−2° C.) and 50% R.H (+/−5) as per ASTM standards. Standard testing conditions are 23° C. (+/−2° C.) and 50% R.H (+/−5) as per ASTM standards.

The test result can be reported by Method A, which uses a 1.5" diameter dart head and 26" drop height or Method B, which uses a 2.0 diameter dart head and 60" drop height. The sample thickness is measured at the sample center and the sample then clamped by an annular specimen holder with an inside diameter of 5 inches. The dart is loaded above the center of the sample and released by either a pneumatic or electromagnetic mechanism.

Testing is carried out according to the 'staircase' method. If the sample fails, a new sample is tested with the weight of the dart reduced by a known and fixed amount. If the sample does not fail, a new sample is tested with the weight of the dart increased by a known amount. After 20 specimens have been tested the number of failures is determined. If this number is 10 then the test is complete. If the number is less than 10 then the testing continues until 10 failures have been recorded. If the number is greater than 10, testing is continued until the total of non-failures is 10. The Dart drop strength is determined from these data as per ASTM D1709 and expressed in grams as the dart drop impact of Type A. All the samples analyzed were 2 mil thick.

Instrumented Dart Impact

Instrumented dart impact method is measured according to ASTM D7192 on plastic film specimens using an Instron CEAST 9350 impact tester. The test is conducted using 12.7 mm diameter tup with hemispherical head, 75 mm diameter clamping assembly with rubber faced grips. The instrument is equipped with an enviromental chamber for testing at low or high temperature. Typical specimen size is 125 mm×125 mm. Standard test velocity is 200 m/min. Film thickness is 2 mil.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 µm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ si for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε F vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° C. Celsius and the column compartment was set at 150° C. Celsius. The columns used were 4 Agilent "Mixed A" 30 cm 20-micron linear mixed-bed columns and a 20-µm pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \tag{EQ 1}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{PeakMax})}{\text{Peak Width at } \frac{1}{2} \text{height}} \right)^2 \tag{EQ 2}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{onetenthheight} - RV_{Peakmax})}{(RV_{Peakmax} - \text{Front Peak } RV_{onetenthheight})} \tag{EQ 3}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° C. Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \tag{EQ 4}$$

$$Mw_{GPC} = \frac{\sum_i (IR_i * M_{polyethylene_i})}{\sum_i IR_i} \tag{EQ 5}$$

$$Mz_{GPC} = \frac{\sum_i (IR_i * M_{polyethylene_i}^2)}{\sum_i (IR_i * M_{polyethylene_i})} \tag{EQ 6}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

Flowrate(effective)=Flowrate(nominal)*(RV(FM Calibrated)/RV(FM Sample)) (EQ 7)

Improved Method for Comonomer Content Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 μl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations (EQ) 10 and 11:

$$ZSVR = \frac{\eta_{0B}}{\eta_{0L}} \quad (EQ\ 10)$$

$$\eta_{0L} = 2.29 \times 10^{-15} M_{w-gpc}^{3.65} \quad (EQ\ 11)$$

The ZSV value is obtained from creep test at 190° C. via the method described above. The Mw-gpc value is determined by the conventional GPC method (Equation 5 in the Conventional GPC method description). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

MD Tear

MD Tear was measured according to ASTM D-1922. The force in grams required to propagate tearing across a film specimen is measured using a Elmendorf Tear tester. Acting by gravity, the pendulum swings through an arc, tearing the specimen from a precut slit. The tear is propagated in the cross direction. Samples are conditioned for a minimum of 40 hours at temperature prior to testing Dynamic Rheolozical Analysis To characterize the rheological behavior of substantially linear ethylene polymers, S Lai and G. W. Knight introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (ANTEC '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI=[3650000\times(\tau_0/\eta_0)-1]/10$$

wherein $\tau_0$ is the characteristic relaxation time of the material and is the zero shear rate complex viscosity of the material. The DRI is calculated by least squares fit of the rheological curve (dynamic complex viscosity $\eta^*(\omega)$ versus applied frequency ($\omega$) e.g., 0.01-100 rads/s) as described in U.S. Pat. No. 6,114,486 with the following generalized Cross equation, i.e.

$$\eta^*(\omega)=\eta_0/[1+(\omega\cdot\tau_0)^n]$$

wherein n is the power law index of the material, $\eta^*(\omega)$ and $\omega$ are the measured complex viscosity and applied frequency data respectively.

Dynamic rheological measurements are carried out, according to ASTM D4440, on a dynamic rheometer (e.g., ARES rheometer by TA Instruments) with 25 mm diameter parallel plates in a dynamic mode under an inert atmosphere. For all experiments, the rheometer has been thermally stable at 190° C. for at least 30 minutes before inserting the appropriately stabilized (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

The values of storage (or elastic) modulus, loss (or viscous) modulus (G"), complex modulus (G*), complex viscosity ($\eta^*$) and tan $\delta$ (the ratio of loss modulus and storage modulus, G"/G') were obtained as a function of frequency ($\omega$) at a given temperature (e.g., 190° C.).

ASTM D882 MD and CD, 1% and 2% Secant Modulus

The film MD (Machine Direction) and CD (Cross Direction) secant modulus was determined per ASTM D882. The reported secant modulus value was the average of five measurements.

Puncture Strength

The Puncture test determines the resistance of a film to the penetration of a probe, at a standard low rate, a single test velocity. The puncture test method is based on ASTM D5748. After film production, the film was conditioned for at least 40 hours at 23° C. (+/−2° C.) and 50% R.H (+/−5), as per ASTM standards. Standard testing conditions are 23° C. (+/−2° C.) and 50% R.H (+/−5) as per ASTM standards. Puncture was measured on a tensile testing machine. Square specimens were cut from a sheet, to a size of "6 inches by 6 inches." The specimen was clamped in a "4 inch diameter" circular specimen holder, and a puncture probe was pushed into the centre of the clamped film, at a cross head speed of 10 inches/minute. The internal test method follows ASTM D5748, with one modification. It deviated from the ASTM D5748 method, in that the probe used, was a "0.5 inch diameter" polished steel ball on a "0.25 inch" support rod (rather than the 0.75 inch diameter, pear shaped probe specified in D5748).

There was a "7.7 inch" maximum travel length to prevent damage to the test fixture. There was no gauge length; prior to testing, the probe was as close as possible to, but not touching the specimen. A single thickness measurement was made in the centre of the specimen. For each specimen, the maximum force, the force at break, the penetration distance, and the energy to break were determined. A total of five specimens were tested to determine an average puncture value. The puncture probe was cleaned using a "Kim-wipe" after each specimen.

EXAMPLES

The following examples illustrate features of the present disclosure but are not intended to limit the scope of the disclosure. The following experiments analyzed the performance of embodiments of the multilayer films described herein.

Example 1A: Preparation of Polyethylene Compositions 1-5

Polyethylene Compositions 1-5, which are described according to the one or more embodiments of the detailed description, were prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

Figure 3:
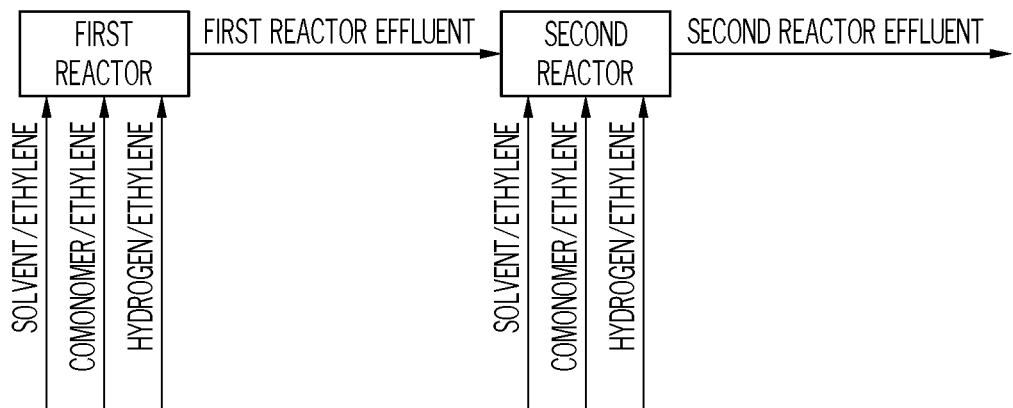
FIG. 3 schematically depicts a reactor system useful for producing polyethylene, according to one or more embodiments presently described.

A two reactor system is used in a series configuration, as is depicted in FIG. 3. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, monomer, comonomer, hydrogen, catalyst components, and polymer) exits the first reactor loop and is added to the second reactor loop.

The second reactor effluent enters a zone where it is deactivated with the addition of and reaction with a suitable reagent (water). At this same reactor exit location other additives are added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The reactor stream feed data flows that correspond to the values in Table 1 used to produced the example are graphically described in FIG. 3. The data are presented such that the complexity of the solvent recycle system is accounted for and the reaction system can be treated more simply as a once through flow diagram. Table 1B shows the catalysts referenced in Table 1A.

TABLE 1A

| Polyethylene Composition | | Polyethylene Composition 1 | Polyethylene Composition 2 | Polyethylene Composition 3 | Polyethylene Composition 4 | Polyethylene Composition 5 |
| --- | --- | --- | --- | --- | --- | --- |
| Reactor Configuration | Type | Dual Series | Dual Series | Dual Series | Dual Series | Dual Series |
| Comonomer type | Type | 1-octene | 1-octene | 1-octene | 1-octene | 1-octene |
| First Reactor Feed Solvent/Ethylene Mass Flow Ratio | g/g | 5.2 | 5.3 | 6.6 | 5.2 | 5.3 |
| First Reactor Feed Comonomer/ Ethylene Mass Flow Ratio | g/g | 0.31 | 0.31 | 0.32 | 0.31 | 0.30 |
| First Reactor Feed Hydrogen/Ethylene Mass Flow Ratio | g/g | 7.9E−05 | 6.3E−05 | 6.2E−05 | 8.9E−05 | 5.4E−05 |
| First Reactor Temperature | °C. | 175 | 175 | 170 | 175 | 175 |
| First Reactor Pressure | barg | 50 | 50 | 50 | 50 | 50 |
| First Reactor Ethylene Conversion | % | 86.7 | 91.0 | 91.0 | 86.7 | 90.9 |
| First Reactor Catalyst Type | Type | Catalyst Component 1 | Catalyst Component 1 | Catalyst Component 1 | Catalyst Component 1 | Catalyst Component 1 |
| First Reactor Co-Catalyst 1 Type | Type | Co-Catalyst 1 | Co-Catalyst 1 | Co-Catalyst 1 | Co-Catalyst 1 | Co-Catalyst 1 |
| First Reactor Co-Catalyst 2 Type | Type | Co-Catalyst 2 | Co-Catalyst 2 | Co-Catalyst 2 | Co-Catalyst 2 | Co-Catalyst 2 |
| First Reactor Catalyst Metal | Type | Zr | Zr | Zr | Zr | Zr |
| First Reactor Co-Catalyst 1 to Catalyst Molar Ratio (B to Zr ratio) | Ratio | 2.4 | 1.1 | 1.2 | 1.5 | 1.5 |
| First Reactor Co-Catalyst 2 to Catalyst Molar Ratio (Al to Zr ratio) | Ratio | 23.7 | 55.0 | 45.0 | 15.8 | 11.5 |
| First Reactor Residence Time | min | 7.8 | 8.5 | 9.0 | 8.0 | 8.5 |
| Second Reactor Feed Solvent/ Ethylene Mass Flow Ratio | g/g | 2.4 | 2.1 | 2.5 | 2.5 | 2.1 |
| Second Reactor Feed Comonomer/ | g/g | 0.148 | 0.068 | 0.063 | 0.086 | 0.061 |

TABLE 1A-continued

| Polyethylene Composition | | Polyethylene Composition 1 | Polyethylene Composition 2 | Polyethylene Composition 3 | Polyethylene Composition 4 | Polyethylene Composition 5 |
|---|---|---|---|---|---|---|
| Ethylene Mass Flow Ratio | | | | | | |
| Second Reactor Feed Hydrogen/Ethylene Mass Flow Ratio | g/g | 3.3E−04 | 1.1E−03 | 3.1E−04 | 3.1E−04 | 1.1E−03 |
| Second Reactor Temperature | °C. | 200 | 200 | 200 | 200 | 200 |
| Second Reactor Pressure | barg | 51 | 50 | 50 | 50 | 50 |
| Second Reactor Ethylene Conversion | % | 85.1 | 74.2 | 88.0 | 85.0 | 84.2 |
| Second Reactor Catalyst Type | Type | Catalyst Component 2 | Catalyst Component 2 | Catalyst Component 2 | Catalyst Component 2 | Catalyst Component 2 |
| Second Reactor Co-Catalyst 1 Type | Type | Co-Catalyst 1 | Co-Catalyst 1 | Co-Catalyst 1 | Co-Catalyst 1 | Co-Catalyst 1 |
| Second Reactor Co-Catalyst 2 Type | Type | Co-Catalyst 2 | Co-Catalyst 2 | Co-Catalyst 2 | Co-Catalyst 2 | Co-Catalyst 2 |
| Second Reactor Catalyst Metal | Type | Zr | Zr | Zr | Zr | Zr |
| Second Reactor Co-Catalyst 1 to Catalyst Molar Ratio (B to Metal ratio) | mol/mol | 1.1 | 10.0 | 6.7 | 13.3 | 17.1 |
| Second Reactor Co-Catalyst 2 to Catalyst Molar Ratio (Al to Metal ratio) | mol/mol | 1443.4 | >100.0 | >100.0 | >100.0 | >100.0 |
| Second Reactor Residence Time | min | 5.6 | 5.7 | 5.4 | 5.6 | 5.7 |
| Percentage of Total Ethylene Feed to First Reactor | wt % | 56.9 | 52.4 | 41.5 | 56.9 | 52.5 |

TABLE 1B

| | |
|---|---|
| Catalyst component 1 | Zirconium dimethyl[[2,2'''-[bis[1-methylethyl)germylene]bis(methyleneoxy-kO)]bis[3'',5,5''-tris(1,1-dimethylethyl)-5'-octyl[1,1':3',1''-terphenyl]-2'-olato-kO]](2-)] |
| Catalyst component 2 | Zirconium, dimethyl [[2,2'''-[1,3-propanediylbis(oxy-kO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-kO]](2-)]- |
| Catalyst component 3 | Hafnium, [[2',2'''-[1,2-cyclohexanediylbis(methyleneoxy-.kappa.O)[bis[3-(9H-carbazol-9-yl)-5-methyl[1,1'-biphenyl]-2-olato-.kappa.O]](2-)]dimethyl- |
| Catalyst component 4 | Catalyst component 4 comprised a Ziegler-Natta type catalyst). The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of EtAlCl2 in heptane, and a solution of Ti(O-iPr)4 in heptane, to yield a composition containing a magnesium concentration of 0.20M, and a ratio of Mg/Al/Ti of 40/12.5/3. An aliquot of this composition was further diluted with ISOPAR-E, to yield a final concentration of 500 ppm Ti in the slurry. While being fed to, and prior to entry into, the polymerization reactor, the catalyst premix was contacted with a dilute solution of Et3Al, in the molar Al to Ti ratio specified in Table XX, to give the active catalyst. |
| Co-catalyst 1 | bis(hydrogenated tallow alkyl)methylammonium tetrakis(pentafluorophenyl)borate(1-) |
| Co-catalyst 2 | modified methyl aluminoxane |
| Co-catalyst 3 | Tri-ethyl aluminum |

Example 1B: Preparation of Polyethylene Composition 6

Polyethylene Compositions 6 and 7, which are described according to the one or more embodiments of the detailed description, were prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system is used in a parallel configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through a specially designed injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

The effluent streams from the first and the second polymerization reactors are combined prior to any additional processing. This final combined reactor effluent enters a zone where it is deactivated with the addition of and reaction with a suitable reagent (water). At this same reactor exit location other additives are added for polymer stabilization (typical antioxidants suitable for stabilization during extrusion and blown film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

Figure 4:
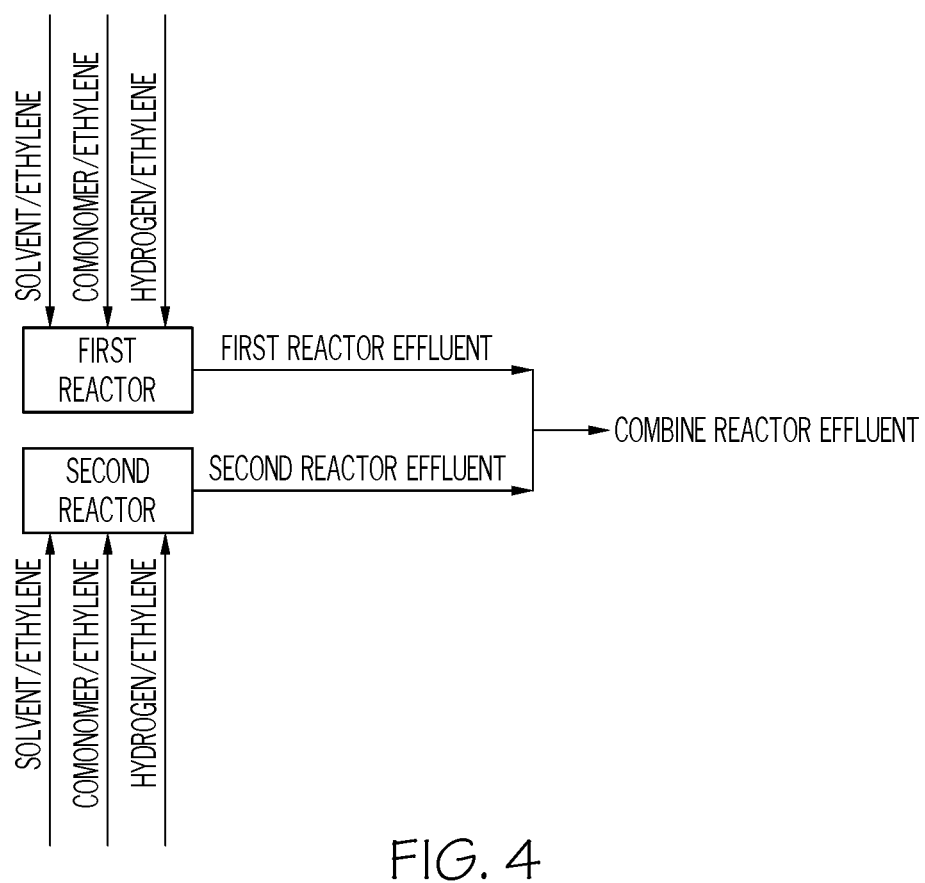
FIG. 4 schematically depicts another reactor system useful for producing polyethylene, according to one or more embodiments presently described.

The reactor stream feed data flows that correspond to the values in Table 2A used to produce the example are graphically described in FIG. 4. The data are presented such that the complexity of the solvent recycle system is accounted for and the reaction system can be treated more simply as a once through flow diagram. Table 1B shows the catalysts referenced in Table 2A of Example 1A.

TABLE 2A

| Polyethylene Composition | | Polyethylene Composition 6 |
|---|---|---|
| Reactor Configuration | Type | Dual Parallel |
| Comonomer type | Type | 1-octene |
| First Reactor Feed Solvent/ Ethylene Mass Flow Ratio | g/g | 10.4 |
| First Reactor Feed Comonomer/ Ethylene Mass Flow Ratio | g/g | 0.33 |
| First Reactor Feed Hydrogen/ Ethylene Mass Flow Ratio | g/g | 6.6E−05 |
| First Reactor Temperature | ° C. | 160 |
| First Reactor Pressure | barg | 50 |
| First Reactor Ethylene Conversion | % | 90.6 |
| First Reactor Catalyst Type | Type | Catalyst component 1 |
| First Reactor Co-Catalyst 1 Type | Type | Co-catalyst 1 |
| First Reactor Co-Catalyst 2 Type | Type | Co-catalyst 2 |
| First Reactor Catalyst Metal | Type | Zr |
| First Reactor Co-Catalyst 1 to Catalyst Molar Ratio (B to Metal ratio) | Ratio | 2.0 |
| First Reactor Co-Catalyst 2 to Catalyst Molar Ratio (Al to Metal ratio) | Ratio | 46.7 |
| First Reactor Residence Time | min | 7.7 |
| Second Reactor Feed Solvent/ Ethylene Mass Flow Ratio | g/g | 2.5 |
| Second Reactor Feed Comonomer/ Ethylene Mass Flow Ratio | g/g | 0.048 |
| Second Reactor Feed Hydrogen/ Ethylene Mass Flow Ratio | g/g | 4.0E−04 |
| Second Reactor Temperature | ° C. | 195 |
| Second Reactor Pressure | barg | 50 |
| Second Reactor Ethylene Conversion | % | 93.7 |
| Second Reactor Catalyst Type | Type | Catalyst component 2 |
| Second Reactor Co-Catalyst 1 Type | Type | Co-catalyst 1 |
| Second Reactor Co-Catalyst 2 Type | Type | Co-catalyst 2 |
| Second Reactor Catalyst Metal | Type | Zr |
| Second Reactor Co-Catalyst 1 to Catalyst Molar Ratio (B to Metal ratio) | mol/mol | 12.0 |
| Second Reactor Co-Catalyst 2 to Catalyst Molar Ratio (Al to Metal ratio) | mol/mol | >100.0 |
| Second Reactor Residence Time | min | 22.9 |
| Percentage of Total Ethylene Feed to First Reactor | wt % | 47.7 |

Example 2: Comparative Compositions A-J

Comparative Compositions A-C were prepared by methods described herein below. Comparative Compositions D-F are bimodal polyethylene compositions that are generally prepared using the catalyst system and processes provided for preparing the Inventive First Compositions in PCT Publication No. WO 2015/200743. Comparative Compositions G-J are commercially available polyethylene compositions. Table 3 identifies the commercially available polyethylene compositions of Comparative Compositions G-J.

TABLE 3

| Sample Comparative Polyethylene Composition | Commercial Name (Company of Manufacture) |
|---|---|
| G | ELITE 5400G (Dow Chemical Co.) |
| H | ELITE 5111G (Dow Chemical Co.) |
| I | EXCEED 1012 (ExxonMobil) |
| J | EXCEED 1018 (ExxonMobil) |

The preparation of Comparative Compositions A-C are described as follows. All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system is used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, monomer, comonomer, hydrogen, catalyst components, and polymer) exits the first reactor loop and is added to the second reactor loop.

The second reactor effluent enters a zone where it is deactivated with the addition of and reaction with a suitable reagent (water). At this same reactor exit location other additives are added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The reactor stream feed data flows that correspond to the values in Table 4A used to produce the example are graphically described in FIG. 3. The data are presented such that the complexity of the solvent recycle system is accounted for and the reaction system can be treated more simply as a once through flow diagram. Table 1B shows the catalysts and co-catalysts shown in Table 4A.

TABLE 4A

| Polyethylene Composition | | Comparative Composition A | Comparative Composition B | Comparative Composition C |
|---|---|---|---|---|
| Reactor Configuration | Type | Dual Series | Dual Series | Dual Series |
| Comonomer type | Type | 1-octene | 1-octene | 1-octene |
| First Reactor Feed Solvent/ Ethylene Mass Flow Ratio | g/g | 5.5 | 5.1 | 5.3 |
| First Reactor Feed Comonomer/ Ethylene Mass Flow Ratio | g/g | 0.22 | 0.39 | 0.36 |
| First Reactor Feed Hydrogen/ Ethylene Mass Flow Ratio | g/g | 1.8E−04 | 1.0E−04 | 9.2E−05 |
| First Reactor Temperature | °C. | 160 | 160 | 160 |
| First Reactor Pressure | barg | 50 | 50 | 50 |
| First Reactor Ethylene Conversion | % | 90.9 | 88.4 | 90.8 |
| First Reactor Catalyst Type | Type | Catalyst component 3 | Catalyst component 1 | Catalyst component 1 |
| First Reactor Co-Catalyst 1 Type | Type | Co-catalyst 1 | Co-catalyst 1 | Co-catalyst 1 |
| First Reactor Co-Catalyst 2 Type | Type | Co-catalyst 2 | Co-catalyst 2 | Co-catalyst 2 |
| First Reactor Catalyst Metal | Type | Hf | Zr | Zr |
| First Reactor Co-Catalyst 1 to Catalyst Molar Ratio (B to Metal ratio) | Ratio | 12.1 | 1.2 | 1.2 |
| First Reactor Co-Catalyst 2 to Catalyst Molar Ratio (Al to Metal ratio) | Ratio | 50.1 | 15.0 | 9.6 |
| First Reactor Residence Time | min | 17.4 | 7.6 | 8.0 |
| Second Reactor Feed Solvent/ Ethylene Mass Flow Ratio | g/g | 2.2 | 2.5 | 2.5 |
| Second Reactor Feed Comonomer/ Ethylene Mass Flow Ratio | g/g | 0.030 | 0.105 | 0.084 |
| Second Reactor Feed Hydrogen/ Ethylene Mass Flow Ratio | g/g | 1.4E−04 | 2.5E−04 | 2.5E−04 |
| Second Reactor Temperature | °C. | 195 | 190 | 190 |
| Second Reactor Pressure | barg | 52 | 51 | 51 |
| Second Reactor Ethylene Conversion | % | 89.1 | 82.9 | 83.7 |

TABLE 4A-continued

| Polyethylene Composition | | Comparative Composition A | Comparative Composition B | Comparative Composition C |
|---|---|---|---|---|
| Second Reactor Catalyst Type | Type | Catalyst component 4 | Catalyst component 2 | Catalyst component 2 |
| Second Reactor Co-Catalyst 1 Type | Type | None | Co-catalyst 1 | Co-catalyst 1 |
| Second Reactor Co-Catalyst 2 Type | Type | Co-catalyst 3 | Co-catalyst 2 | Co-catalyst 2 |
| Second Reactor Catalyst Metal | Type | Ti | Zr | Zr |
| Second Reactor Co-Catalyst 1 to Catalyst Molar Ratio (B to Metal ratio) | mol/mol | n/a | 1.2 | 1.2 |
| Second Reactor Co-Catalyst 2 to Catalyst Molar Ratio (Al to Metal ratio) | mol/mol | 4.0 | 3950 | 3520 |
| Second Reactor Residence Time | min | 7.7 | 5.8 | 5.8 |
| Percentage of Total Ethylene Feed to First Reactor | wt % | 27.9 | 60.7 | 58.1 |

Example 3: Analysis of Polyethylene Samples

Figure 2:
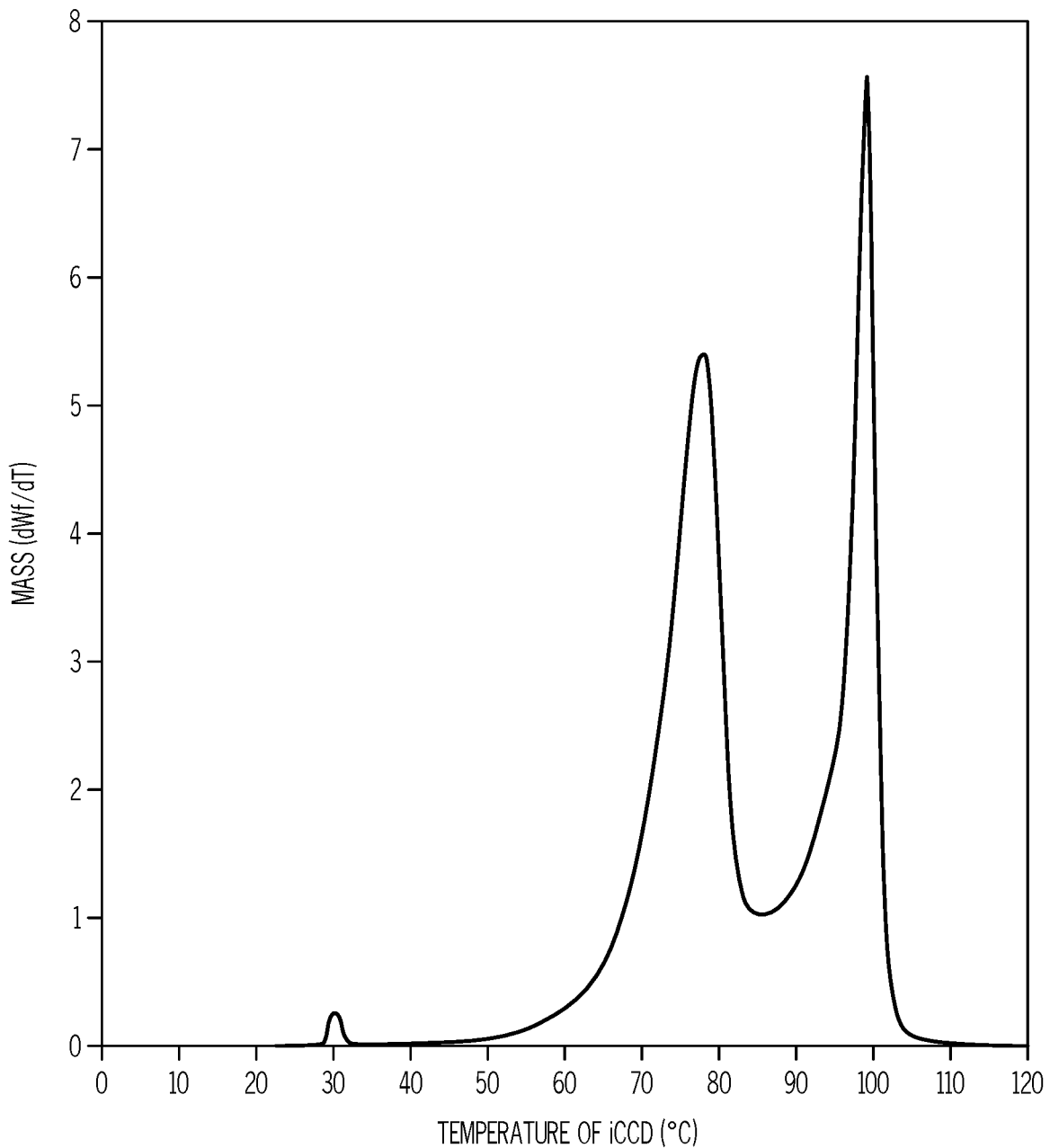
FIG. 2 graphically depicts the iCCD elution profile a polyethylene composition of Example 1, according to one or more embodiments presently described.

Polyethylene Compositions 1-6 of Examples 1A and 1B, Comparative Polyethylene Compositions A-C of Example 2, as well as commercially available Comparative Polyethylene Samples D-J of Example 2 were analyzed by iCCD. The iCCD data of Polyethylene Composition 5 is provided in FIG. 2. Additional data generated from the iCCD testing of all samples is provided in Tables 5A and 5B. Specifically, Tables 5A and 5B includes analysis of the iCCD data, including the areas of the respective first and second polyethylene fractions (45-87° C. and 95-120° C. Additional data is also provided for each example composition including overall density, Dart strength (method A), melt index, weight average molecular weight in the second PE fraction. These properties are based on monolayer blown films consisting completely of each polyethylene sample.

To conduct dart testing as well as other testing based on formed films, 2 mil blown films were formed with the polyethylene samples. Specifically, monolayer blown films are produced via an Egan Davis Standard extruder, equipped with a semi grooved barrel of ID 3.5 inch; 30/1 L/D ratio; a barrier screw; and an Alpine air ring. The extrusion line has an 8 inch die with internal bubble cooling. The extrusion line also has a film thickness gauge scanner. The film fabrication conditions were: film thickness maintained at 2 mil (0.001 in or 0.0254 mm); blow up ratio (BUR) 2.5; die gap 70 mil; and frost line height (FLH) 37 inch. The output rate was constant at 260 lbs/hr.

TABLE 5A

| | | | | PE Sample | | |
|---|---|---|---|---|---|---|
| Unit | | Overall density (g/cm3) | Overall MI g/10 min | First PE fraction area (45-87° C.) % | Second PE fraction area (95-120° C.) % | First PE fraction area to Second PE fraction area ratio |
| 1 | | 0.925 | 0.85 | 55.97% | 29.09% | 1.92 |
| 3 | | 0.928 | 0.85 | 45.24% | 43.81% | 1.03 |
| 5 | | 0.928 | 0.85 | 57.96% | 29.23% | 1.98 |
| 6 | | 0.93 | 0.50 | 47.08% | 44.07% | 1.07 |
| A | | 0.935 | 0.85 | 31.80% | 53.70% | 0.59 |
| B | | 0.918 | 0.85 | 65.50% | 24.30% | 2.70 |
| C | | 0.918 | 0.85 | 67.80% | 24.97% | 2.72 |
| D | | 0.912 | 0.85 | 76.41% | 7.49% | 10.20 |
| E | | 0.918 | 0.85 | 60.58% | 17.33% | 3.50 |
| F | | 0.925 | 0.85 | 55.35% | 21.44% | 2.58 |
| G | | 0.916 | 1.00 | 73.66% | 9.55% | 7.71 |
| H | | 0.925 | 0.85 | 52.82% | 21.84% | 2.42 |
| I | | 0.912 | 1.00 | 91.22% | 1.51% | 60.41 |
| J | | 0.918 | 1.00 | 73.38% | 5.44% | 13.49 |

TABLE 5B

| | PE Sample | | | | | |
|---|---|---|---|---|---|---|
| Unit | Mw of second PE fraction (g/mol) | Overall polyethylene composition MWD | Dart A g | MD Tear gf | FWHM ° C. | First PE fraction melt index g/10 min |
| 1 | 60444 | 3.5 | 1200 | 252 | 4 | 0.15 |
| 3 | 61805 | 3.5 | 1000 | 168 | 2.8 | 0.1 |
| 5 | 45684 | 4.6 | 1800 | 226 | 3.2 | 0.15 |
| 6 | 54882 | 4 | 2200 | 144 | 2.8 | 0.05 |
| A | 119731 | 3.9 | 300 | 103 | 4.2 | 0.1 |
| B | 65836 | 2.8 | 2200 | 303 | 3 | 0.28 |
| C | 72441 | 2.8 | 1800 | 324 | 2.8 | 0.3 |
| D | 96844 | 3.8 | 2000 | — | — | 0.2 |
| E | 107698 | 3.8 | 1700 | 292 | — | 0.2 |
| F | 95477 | 3.5 | 700 | 214 | 10.6 | 0.15 |
| G | 126779 | 3.9 | 1200 | — | — | — |
| H | 114384 | 3.7 | 400 | — | — | — |
| I | 73300 | 2.4 | 1800 | — | — | — |
| J | 91878 | 2.5 | 1200 | — | — | — |

The results show that no comparative example compositions display comparable dart strengths at overall densities of at least 0.924 g/cm³. For example, some comparative examples have high dart strength, but these samples have much lower density. Higher density comparative samples (e.g., 0.924 g/cm³ to 0.936 g/cm³) display much lower dart strength (e.g., less than 1000 grams).

Additionally, several compositions of Example 1 had Dow Rheology Indexes of less than 10, such as 3.5, 4.6, and 5.5.

Example 4: Preparation of Comparative Films 4A-4H

In Example 4, eight comparative multilayer films were produced. The materials used to produce Comparative Films 4A-4H included DOWLEX™ 2038.68 (commercially-available from The Dow Chemical Company), DMDA 6200 (commercially-available from The Dow Chemical Company), DMDH 6400 (commercially-available from The Dow Chemical Company), AGILITY™ 1200 (commercially-available from The Dow Chemical Company), ELITE™ 5960 (commercially-available from The Dow Chemical Company), Polyethylene Composition 2 of Example 1A above, an antiblock masterbatch (commercially-available from Ampacet, "MB AB"), a polymer processing aid masterbatch (commercially-available from Ingenia, "MB PPA"), a titanium dioxide masterbatch (commercially-available from Ampacet, "MB TiO₂", and two bimodal polyethylene compositions (melt index: 0.85 g/10 min at 2.16 kg and 190° C., density: 0.918 g/cm³, "Bimodal PE1") and (melt index: 0.85 g/10 min at 2.16 kg and 190° C., density: 0.926 g/cm³, "Bimodal PE2")). Bimodal PE1 and Bimodal PE2 are polyethylene compositions that are generally prepared using the catalyst system and processes provided for preparing the Inventive First Compositions in PCT Publication No. WO 2015/200743.

The compositions of the various layers of the comparative multilayered film for this example are detailed in Tables 6-8. For the compositions provided in Tables 6-8, the weight percent provided for each layer is based on the total weight of the multilayer film (i.e., in Table 8, Layer 3 is 10 wt. % based on the total weight of Comparative Film 4F), and the weight percent provided for each material component is based on the total weight of layer (i.e., in Table 8, Bimodal PE1 is 94 wt. % based on the total weight of Layer 3 in Comparative Film 4F).

TABLE 6

Compositions of Comparative Three-Layer Films 4A and 4B having an overall thickness of 110 μm.

|  | Comparative Film 4A | Comparative Film 4B |
|---|---|---|
| Overall Thickness | 110 μm | 110 μm |
| Overall Density | 0.925 g/cm³ | 0.932 g/cm³ |
| Outer Layer 1 (33 wt. %) | 97.5 wt. % Bimodal PE1 2.5 wt. % MB AB/PPA | 87.5 wt. % Bimodal PE1 10 wt. % AGILITY ™ 1200 2.5 wt. % MB AB/PPA |
| Core Layer (34 wt. %) | 63% DOWLEX ™ 2038.68 30% DMDA 6200 7% MB TiO₂ | 93 wt. % DMDH 6400 7 wt. % MB TiO₂ |
| Outer Layer 2 (33 wt. %) | 70% Bimodal PE1 27.5% AGILITY ™ 1200 2.5% MB AB/PPA | 87.5 wt. % Bimodal PE1 10 wt. % AGILITY ™ 1200 2.5 wt. % MB AB/PPA |

TABLE 7

Compositions of Comparative Three-Layer Films 4C, 4D, and 4E having an overall thickness of 102 μm (down-gauged).

|  | Comparative Film 4C | Comparative Film 4D | Comparative Film 4E |
|---|---|---|---|
| Overall Thickness | 102 μm | 102 μm | 102 μm |
| Overall Density | 0.932 | 0.932 | 0.934 |
| Outer Layer 1 (33 wt. %) | 87.5 wt. % Bimodal PE1 10 wt. % AGILITY ™ 1200 2.5 wt. % MB AB/PPA | 97.5 wt. % Bimodal PE1 2.5 wt. % MB AB/PPA | 37.5 wt. % Bimodal PE1 60 wt. % PE Comp. 2 2.5 wt. % MB AB/PPA |
| Core Layer (34 wt. %) | 93 wt. % DMDH 6400 7 wt. % MB TiO2 | 93 wt. % DMDH 6400 7wt. % MB TiO2 | 93 wt. % DMDH 6400 7wt. % MB TiO2 |
| Outer Layer 2 (33 wt. %) | 87.5 wt. % Bimodal PE1 10 wt. % AGILITY ™ 1200 2.5 wt. % MB AB/PPA | 97.5 wt. % Bimodal PE1 2.5 wt. % MB AB/PPA | 87.5 wt. % Bimodal PE1 10 wt. % AGILITY ™ 1200 2.5 wt. % MB AB/PPA |

TABLE 8

Composition of Comparative Five-Layer Films 4F, 4G, and 4H having an overall thickness of 110 μm.

|  | Comparative Film 4F | Comparative Film 4G | Comparative Film 4H |
|---|---|---|---|
| Overall Thickness | 110 μm | 110 μm | 102 μm |
| Overall Density | 0.931 g/cm3 | 0.931 g/cm3 | 0.931 |
| Layer 1 (30 wt. %) | 87.5 wt. % Bimodal PE1 10 wt. % AGILITY ™ 1200 2.5 wt. % MB AB/PPA | 87.5 wt. % Bimodal PE1 10 wt. % AGILITY ™ 1200 2.5 wt. % MB AB/PPA | 87.5 wt. % Bimodal PE1 10 wt. % AGILITY ™ 1200 2.5 wt. % MB AB/PPA |
| Layer 2 (15 wt. %) | 94 wt. % DMDH 6400 6 wt. % MB TiO₂ | 94 wt. % ELITE ™ 5960 6 wt. % MB TiO₂ | 94 wt. % DMDH 6400 6 wt. % MB TiO₂ |

TABLE 8-continued

Composition of Comparative Five-Layer Films 4F,
4G, and 4H having an overall thickness of 110 μm.

|  | Comparative Film 4F | Comparative Film 4G | Comparative Film 4H |
|---|---|---|---|
| Layer 3 (10 wt. %) | 94 wt. % Bimodal PE2<br>6 wt. % MB TiO$_2$ | 94 wt. % Bimodal PE2<br>6 wt. % MB TiO$_2$ | 94 wt. % Bimodal PE2<br>6 wt. % MB TiO$_2$ |
| Layer 4 (15 wt. %) | 94 wt. % DMDH 6400<br>6 wt. % MB TiO$_2$ | 94 wt. % ELITE ™ 5960<br>6 wt. % MB TiO$_2$ | 94 wt. % DMDH 6400<br>6 wt. % MB TiO$_2$ |
| Layer 5 (30 wt. %) | 87.5 wt. % Bimodal PE1<br>10 wt. % AGILITY ™ 1200<br>2.5 wt. % MB AB/PPA | 87.5 wt. % Bimodal PE1<br>10 wt. % AGILITY ™ 1200<br>2.5 wt. % MB AB/PPA | 87.5 wt. % Bimodal PE1<br>10 wt. % AGILITY ™1200<br>2.5 wt. % MB AB/PPA |

As can be seen from Tables 6 and 7, some of the comparative films have three layers (Comparative Films 4A, 4B, 4C, 4D, and 4E) while some of the comparative films have five layers (Comparative Films 4F, 4G, and 4H).

Comparative Films 4A and 4B were produced on an Alpine 7-layer blown film line. The diameter of the extrusion die was 200 millimeters (mm) and the die gap was 78.7 mils. The blow-up ratio (BUR) was 1.75 and lay-flat width 21.85 inch. The nip speed was 60.4 to 65 ft/min. The total film thickness was 4.3 mils (1 mil=/1000 of an inch). The line had 7 extruders. For the 7-layer multilayer films (Comparative Films 4A and 4B), extruders 1 and 2 were used for the outer layer 1, extruder 3, 4 and 5 were used for core layer and extruder 6 and 7 for the outer layer 2. The extruder temperature profile started at 380° F. and ended at 450° F. When a blend was used in certain layer, the ingredients were dry-blended and fed to the feeder.

Comparative Films 4C, 4D, and 4E were produced on an Alpine 7-layer blown film line. The diameter of the extrusion die was 200 millimeters (mm) and the die gap was 78.7 mils. The blow-up ratio (BUR) was 1.75 and lay-flat width 21.85 inch. The nip speed was 60.4 to 65 ft/min. The total film thickness was 4.0 mils (1 mil=/1000 of an inch). The line had 7 extruders. For the 7-layer multilayer films (Comparative Films 4C, 4D and 4E), extruders 1 and 2 were used for the outer layer 1, extruder 3, 4 and 5 were used for core layer and extruder 6 and 7 for the outer layer 2. The extruder temperature profile started at 380° F. and ended at 450° F. When a blend was used in certain layer, the ingredients were dry-blended and fed to the feeder.

Comparative Films 4F, 4G, and 4H were manufactured on an Alpine 7-layer blown film line. The diameter of the extrusion die was 200 millimeters (mm) and the die gap was 78.7 mils. The blow-up ratio (BUR) was 1.75 and lay-flat width 21.85 inch. The nip speed was 60.4 to 65 ft/min. The total film thickness was 4.3 mils for Film 4F and Film 4G, and 4.0 mils for Film 4H (1 mil=/1000 of an inch). The line had 7 extruders. For the 7-layer multilayer films (Comparative Films 4F, 4G, and 4H), extruder 1 was used for the Layer 1, extruders 2 and 3 were used for the Layer 2, extruder 4 was used for Layer 3, extruder 5 and 6 were used for Layer 4, and extruder 7 for the Layer 5. The extruder temperature profile started at 380° F. and ended at 450° F. When a blend was used in certain layer, the ingredients were dry-blended and fed to the feeder.

Example 5: Preparation of Films 5A-5E

In Example 5, five multilayer films were produced in accordance with the embodiments disclosed herein. The materials used to produce Films 5A-5E included Bimodal PE1, DOWLEX™ 2038.68 (commercially-available from The Dow Chemical Company), DMDA 6200 (commercially-available from The Dow Chemical Company), DMDH 6400 (commercially-available from The Dow Chemical Company), AGILITY™ 1200 (commercially-available from The Dow Chemical Company), ELITE™ 5960 (commercially-available from The Dow Chemical Company), and Polyethylene Composition 2 of Example 1A above, an antiblock masterbatch (commercially-available from Ampacet, "MB AB"), a polymer processing aid masterbatch (commercially-available from Ingenia, "MB PPA") and a titanium dioxide masterbatch (commercially-available from Ampacet, "MB TiO$_2$"). The compositions of the various layers of the comparative multilayered film for this example are detailed in Tables 9-11. For the compositions provided in Tables 9-11, the weight percent provided for each layer is based on the total weight of the multilayer film (i.e., in Table 9, Layer 3 is 30 wt. % based on the total weight of Film 5A), and the weight percent provided for each material component is based on the total weight of layer (i.e., in Table 9, Polyethylene Composition 2 is 94 wt. % based on the total weight of Layer 3 in Film 5A).

TABLE 9

Compositions of Five-Layer Film 5A having
an overall thickness of 102 μm.

|  | Film 5A |
|---|---|
| Overall Thickness | 102 μm |
| Overall Density | 0.933 |
| Layer 1 (20 wt. %) | 97.5 wt. % Bimodal PE1<br>2.5 wt. % MB AB/PPA |
| Layer 2 (15 wt. %) | 94 wt. %% DMDH 6400<br>6 wt. %% MB TiO$_2$ |
| Layer 3 (30 wt. %) | 94 wt. %% PE Comp. 2<br>6 wt. %% MB TiO$_2$ |
| Layer 4 (15 wt. %) | 94 wt. % DMDH 6400<br>6 wt % MB TiO$_2$ |
| Layer 5 (20 wt. %) | 92.5 wt. % Bimodal PE1<br>5 wt. % AGILITY ™ 1200<br>2.5 wt. % MB AB/PPA |

TABLE 10

Compositions of Five-Layer Film 5B having an overall thickness of 102 μm.

| | Film 5B |
|---|---|
| Overall Thickness | 102 μm |
| Overall Density | 0.936 |
| Layer 1 (30 wt. %) | 97.5 wt. % Bimodal PE2<br>2.5 wt. % MB AB/PPA |
| Layer 2 (15 wt. %) | 94 wt. % DMDH 6400<br>6 wt % MB TiO$_2$ |
| Layer 3 (10 wt. %) | 94 wt. % PE Comp. 2<br>6 wt. % MB TiO$_2$ |
| Layer 4 (15 wt. %) | 94 wt. % DMDH 6400<br>6 wt. % MB TiO$_2$ |
| Layer 5 (30 wt. %) | 92.5 wt. % Bimodal PE2<br>5 wt. % AGILITY™1200<br>2.5 wt. % MB AB/PPA |

TABLE 11

Compositions of Five-Layer Films 5C, 5D, and 5E having an overall thickness of 102 μm.

| | Film 5C | Film 5D | Film 5E |
|---|---|---|---|
| Overall Thickness | 102 μm | 102 μm | 102 μm |
| Overall Density | 0.929 | 0.928 | 0.928 |
| Layer 1 (25 wt. %) | 97.5 wt. % Bimodal PE1<br>2.5 wt. % MB AB/PPA | 97.5 wt. % ELITE™ 5400<br>2.5 wt. % MB AB/PPA | 97.5 wt. % DOWLEX™ GM 8070<br>2.5 wt. % MB AB/PPA |
| Layer 2 (10 wt. %) | 94 wt. % DMDH 6400<br>6 wt. % MB TiO$_2$ | 94 wt. % DMDH 6400<br>6 wt. % MB TiO$_2$ | 94 wt. % DMDH 6400<br>6 wt. % MB TiO$_2$ |
| Layer 3 (30 wt. %) | 94 wt. % PE Comp. 2<br>6 wt. % MB TiO$_2$ | 94 wt. % PE Comp. 2<br>6 wt. % MB TiO$_2$ | 94 wt. % PE Comp. 2<br>6 wt. % MB TiO$_2$ |
| Layer 4 (10 wt. %) | 94 wt. % DMDH 6400<br>6 wt. % MB TiO$_2$ | 94 wt. % DMDH 6400<br>6 wt. % MB TiO$_2$ | 94 wt. % DMDH 6400<br>6 wt. % MB TiO$_2$ |
| Layer 5 (25 wt. %) | 92.5 wt. % Bimodal PE1<br>5 wt. % AGILITY™ 1200<br>2.5 wt. % MB AB/PPA | 92.5 wt. % ELITE™ 5400<br>5 wt. % AGILITY™1200<br>2.5 wt. % MB AB/PPA | 92.5 wt. % DOWLEX™ GM 8070<br>5 wt. % AGILITY™1200<br>2.5 wt. % MB AB/PPA |

Films 5A, 5B, 5C, 5D, and 5E were produced on an Alpine 7-layer blown film line. The diameter of the extrusion die was 200 millimeters (mm) and the die gap was 78.7 mils. The blow-up ratio (BUR) was 1.75 and lay-flat width 21.85 inch. The nip speed was 60.4 to 65 ft/min. The total film thickness was 4.0 mils (1 mil=/1000 of an inch). The line had 7 extruders. For the 7-layer multilayer films (Films 5A, 5C, 5D and 5E), extruders 1 was used for Layer 1, extruder 2 was used for Layer 2, extruder 3, 4 and 5 were used for Layer 3, extruder 6 for Layer 4, and extruder 7 for Layer 5. For the 7-layer multilayer film (Films 5B), extruders 1 was used for Layer 1, extruder 2 and 3 were used for Layer 2, extruder 4 were used for Layer 3, extruder 5 and 6 for Layer 4, and extruder 7 for Layer 5. The extruder temperature profile started at 380° F. and ended at 450° F. When a blend was used in certain layer, the ingredients were dry-blended and fed to the feeder.

Example 6: Analysis of Comparative Films 4A-4H and Films 5A-5E

In Example 6, the properties of Films 5A-5E were tested according to the test methods disclosed herein, analyzed, and compared with the properties of Comparative Films 4A-4H. The properties of Films 5A-5E and Comparative Films 4A-4H are detailed in Tables 12 and 13.

TABLE 12

Dart Drop Impact, Puncture Energy, Tear (CD), Tear (MD) of Comparative Films 4A-4H and Films 5A-5E.

| Units | Thickness, Density | Dart Drop Impact - Type A g | Puncture - Energy To Break in*lbf | Tear - Elmendorf - Type B - CD gf | Tear - Elmendorf - Type B - MD gf |
|---|---|---|---|---|---|
| Comparative Film 4A | 110 μm 0.925 g/cm³ | 576 | 43 | 2667 | 715 |
| Comparative Film 4B | 110 μm 0.932 g/cm³ | 540 | 45 | 2607 | 457 |
| Comparative Film 4C | 102 μm 0.932 g/cm³ | 498 | 34 | 2510 | 416 |
| Comparative Film 4D | 102 μm 0.932 g/cm³ | 624 | 45 | 2359 | 565 |
| Comparative Film 4E | 102 μm 0.934 g/cm³ | 594 | 41 | 1786 | 375 |
| Comparative Film 4F | 110 μm 0.931 g/cm³ | 618 | 56 | 2627 | 550 |
| Comparative Film 4G | 110 μm 0.931 g/cm³ | 708 | 60 | 2374 | 661 |
| Comparative Film 4H | 102 μm 0.931 g/cm³ | 540 | 43 | 2493 | 465 |
| Film 5A | 102 μm 0.933 g/cm³ | 708 | 59 | 1687 | 417 |
| Film 5 B | 102 μm 0.936 g/cm³ | 558 | 36 | 2175 | 343 |
| Film 5C | 102 μm 0.929 g/cm³ | 858 | 52 | 1885 | 695 |
| Film 5D | 102 μm 0.928 g/cm³ | 873 | 60 | 1753 | 533 |
| Film 5E | 102 μm 0.928 g/cm³ | 747 | 46 | 1590 | 466 |

As shown in Table 12, Films 5A-5E generally showed improved (greater) dart and puncture properties when compared to Comparative Films 4A-4H. Particularly when compared to the 5-layer Comparative Films 4E-4H, which each had an overall thickness of 110 m, Films 5A, 5C, 5D, and 5E, which each had an overall thickness of 102 μm, showed greater dart and puncture properties. These results show that at comparable overall densities, the "down-gauged" Films 5A-E including a polyethylene composition described herein exhibited improved properties over the 110 μm 5-layer Comparative Films.

TABLE 13

Average Secant Modulus (CD), and Average Secant Modulus (MD), Creep (CD at 1.7 kg), and Creep (CD at 1.4 kg) of Comparative Films 4A-4H and Films 5A-5E.

| Units | Thickness, Density | Avg-2% Secant Modulus - CD psi | Avg-Secant Modulus At 2% - MD psi | Tensile - Creep - Single Point - Film - CD (1.7 kg) % | Tensile - Creep - Single Point - Film - CD (1.4 kg) % |
|---|---|---|---|---|---|
| Comparative Film 4A | 110 μm 0.925 g/cm³ | 52248 | 45210 | 59 | 29 |
| Comparative Film 4B | 110 μm 0.932 g/cm³ | 75574 | 64297 | 45 | 12 |
| Comparative Film 4C | 102 μm 0.932 g/cm³ | 75732 | 63973 | * | 19 |
| Comparative Film 4D | 102 μm 0.932 g/cm³ | 72086 | 60576 | * | 20 |
| Comparative Film 4E | 102 μm 0.934 g/cm³ | 76633 | 63391 | * | 18 |
| Comparative Film 4F | 110 μm 0.931 g/cm³ | 70399 | 59515 | 67 | 15 |
| Comparative Film 4G | 110 μm 0.931 g/cm³ | 64107 | 58457 | 58 | 15 |
| Comparative Film 4H | 102 μm 0.931 g/cm³ | 70277 | 59132 | * | 31 |
| Film 5A | 102 μm 0.933 g/cm³ | 73612 | 66352 | 48 | 11 |
| Film 5B | 102 μm 0.936 g/cm³ | 80609 | 68390 | 35 | 13 |
| Film 5C | 102 μm 0.929 g/cm³ | 60571 | 52934 | * | 27 |

TABLE 13-continued

Average Secant Modulus (CD), and Average Secant Modulus (MD), Creep (CD at 1.7 kg), and Creep (CD at 1.4 kg) of Comparative Films 4A-4H and Films 5A-5E.

| Units | Thickness, Density | Avg-2% Secant Modulus - CD psi | Avg-Secant Modulus At 2% - MD psi | Tensile - Creep - Single Point - Film - CD (1.7 kg) % | Tensile - Creep - Single Point - Film - CD (1.4 kg) % |
|---|---|---|---|---|---|
| Film 5D | 102 μm 0.928 g/cm³ | 57183 | 51805 | * | 33 |
| Film 5E | 102 μm 0.928 g/cm³ | 58111 | 50875 | * | 31 |

* Formulation failed to achieve creep performance at given conditions (1.7 kgf/50° C./15 h); the sample yielded to its maximum extension prior to the end time of the test.

As shown in Table 13, Films 5A-5E generally showed improved (greater) average secant modulus at 2% in the cross direction and machine direction when compared to Comparative Films 4A-4H. Particularly when compared to the 5-layer Comparative Films 4E-4H, which each had an overall thickness of 110 μm, Films 5A-5E, which each had an overall thickness of 102 μm, showed greater or comparable results in secant modulus at 2% in the cross direction and machine direction. These results show that at comparable overall densities, the "down-gauged" Films 5A-5E including a polyethylene composition described herein exhibited improved properties over the 110 μm 5-layer Comparative Films.

Therefore, based on both the results of Tables 12 and 13, at comparable overall densities, the "down-gauged" Films 5A-5E including a polyethylene composition described herein exhibited improved properties over the 110 μm 5-layer Comparative Films. Moreover, these results show that Films 5A-5E may provide a balance of stiffness, creep resistance and abuse properties (e.g. dart, puncture energy, tear) at reduced thicknesses.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A multilayer film comprising:
a first layer comprising a first polyolefin;
a second layer comprising a second polyolefin;
a third layer comprising a third polyolefin, wherein the second layer is positioned between the first layer and the third layer;
a fourth layer comprising a fourth polyolefin, wherein the third layer is positioned between the second layer and the fourth layer; and
a fifth layer comprising a fifth polyolefin, wherein the fourth layer is positioned between the third layer and the fifth layer;
wherein two or more of the first polyolefin, the second polyolefin, the third polyolefin, the fourth polyolefin, and the fifth polyolefin are the same or different in composition; and
wherein the third polyolefin is a polyethylene composition comprising:
(a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and
(b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.;
wherein the polyethylene composition has a density of 0.924 g/cm³ to 0.936 g/cm³ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

2. The multilayer film of claim 1, wherein one or more of the first layer, the second layer, the third layer, the fourth layer, or the fifth layer are in direct contact with one another.

3. The multilayer film of claim 1, wherein the first layer and the fifth layer are the outermost layers of the multilayer film.

4. The multilayer film of claim 1, wherein:
the first layer is in direct contact with the second layer;
the second layer is in direct contact with the third layer;
the third layer is in direct contact with the fourth layer; and
the fourth layer is in direct contact with the fifth layer.

5. The multilayer film of claim 1, wherein the polyethylene composition of the third layer has a zero shear viscosity ratio of less than 3.0.

6. The multilayer film of claim 1, wherein the polyethylene composition of the third layer has a molecular weight distribution, expressed as the ratio of the weight average molecular weight to number average molecular weight ($M_w/M_n$), in the range of from 2.5 to 8.0.

7. The multilayer film of claim 1, wherein the multilayer film has a thickness of 15 microns to 250 microns.

8. The multilayer film of claim 1, wherein one or both of the second polyolefin or the fourth polyolefin is a polyethylene having a density of greater than 0.940 g/cm³, when measured according to ASTM 742.

9. The multilayer film of claim 1, wherein one or both of the first polyolefin or the fifth polyolefin is a linear low density polyethylene having a density from 0.905 g/cm³ to 0.936 g/cm³.

10. The multilayer film of claim 1, wherein the multilayer film has a dart drop impact of at least 700 grams when measured according to ASTM D1709 Method A.

11. The multilayer film of claim 1, wherein the multilayer film has an average secant modulus in a machine direction of at least 60,000 psi, wherein the average secant modulus is measured in accordance with ASTM D882.

12. The multilayer film of claim 1, wherein the multilayer film has an overall density of at least 0.925 g/cm$^3$.

13. The multilayer film of claim 1, wherein the multilayer film a tensile creep in a cross direction of less than 50%, when measured in accordance with ASTM D2990 at 1.7 kg, 15 hours, and 50° C.

14. A multilayer film comprising:
   a first layer comprising a linear low density polyethylene having a density from 0.905 g/cm$^3$ to 0.936 g/cm$^3$;
   a second layer comprising a polyethylene having a density of greater than 0.940 g/cm$^3$, when measured according to ASTM 742:
   a third layer comprising a third polyolefin, wherein the second layer is positioned between the first layer and the third layer;
   a fourth layer comprising a polyethylene having a density of greater than 0.940 g/cm$^3$, when measured according to ASTM 742, wherein the third layer is positioned between the second layer and the fourth layer; and
   a fifth layer comprising a linear low density polyethylene having a density from 0.905 g/cm$^3$ to 0.936 g/cm$^3$, wherein the fourth layer is positioned between the third layer and the fifth layer; and
   wherein two or more of the first polyolefin, second polyolefin, third polyolefin, and fourth polyolefin have the same or different; and
   wherein the third polyolefin is a polyethylene composition comprising:
   (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and
   (b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.;
   wherein the polyethylene composition has a density of 0.924 g/cm$^3$ to 0.936 g/cm$^3$ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

15. The multilayer film of claim 14, wherein:
the first layer and the fifth layer are the outermost layers of the multilayer film;
the first layer is in direct contact with the second layer;
the second layer is in direct contact with the third layer;
the third layer is in direct contact with the fourth layer; and
the fourth layer is in direct contact with the fifth layer.

\* \* \* \* \*